United States Patent [19]
Miyake et al.

[11] Patent Number: 5,202,869
[45] Date of Patent: Apr. 13, 1993

[54] OPTICAL HEAD DEVICE INCLUDING DIFFRACTION GRATING

[75] Inventors: Takahiro Miyake; Yoshio Yoshida; Yukio Kurata, all of Tenri, Japan

[73] Assignee: Sharp Kabushiki Kaisha, Osaka, Japan

[21] Appl. No.: 705,802

[22] Filed: May 28, 1991

Related U.S. Application Data

[63] Continuation-in-part of Ser. No. 687,478, Apr. 18, 1991.

[30] Foreign Application Priority Data

Apr. 20, 1990 [JP] Japan .................. 2-105937
May 29, 1990 [JP] Japan .................. 2-138893

[51] Int. Cl.$^5$ ............................................. G11B 7/09
[52] U.S. Cl. .................. 369/44.23; 369/44.41; 369/112
[58] Field of Search ............. 369/44.23, 44.24, 44.41, 369/44.42, 109, 111, 112, 120; 359/569, 571, 576

[56] References Cited

U.S. PATENT DOCUMENTS

| | | |
|---|---|---|
| 4,333,173 | 6/1982 | Yonezawa et al. |
| 4,983,017 | 1/1991 | Tsuji et al. ............. 369/109 X |
| 5,066,138 | 11/1991 | Toide et al. ............. 369/112 |
| 5,111,448 | 5/1992 | Komma et al. ............. 369/44.23 |
| 5,111,449 | 5/1992 | Kurata et al. ............. 369/112 X |

FOREIGN PATENT DOCUMENTS

0305169 3/1989 European Pat. Off.
0338840 10/1989 European Pat. Off.

OTHER PUBLICATIONS

Patent Abstracts of Japan, vol. 14, No. 50 (P-0998) Jan. 30, 1990, & JP 01-279433.
Yoshida et al., "CD Optical Head Using Holographic Optical Element", Jul. 1989, pp. 102-107.
Japan Society of Precision Engineering, "CD Pickup Using a Holographic Optical Element", date unknown, (56-10-90-10-1775) and an English Abstract thereof.

*Primary Examiner*—Wayne R. Young
*Attorney, Agent, or Firm*—David G. Conlin

[57] ABSTRACT

An optical head device having an optical system provided with at least a light source, a shaping prism, a diffracting element and a photodetector. The light source emits light whose cross-sectional intensity distribution has an elliptic shape. The shaping prism directs the light to a recording medium after shaping the intensity distribution thereof into a circular shape. The diffracting element has diffracting regions formed by at least one division line parallel to a reference direction. The light reflected from the recording medium forms an elliptic bright portion on the diffracting element. The photodetector is divided by a plurality of division lines, at least one of which is parallel to the reference direction. When there is no focus error, the diffracting element diffracts the reflected light so as to converge it on the division line substantially parallel to the reference direction in the photodetector. For example, when the shaping prism is adapted to shape the elliptic intensity distribution with respect to its major axis direction, the optical system is arranged so that the major axis of the bright portion coincides with the division line of the diffracting element. Thus, it is possible to obtain preferable focusing control.

18 Claims, 20 Drawing Sheets

REFERENCE DIRECTION

OPTICAL HEAD DEVICE INCLUDING DIFFRACTION GRATING

This is a continuation-in-part of copending application Ser. No. 07/687,478 filed on Apr. 19, 1991, pending.

FIELD OF THE INVENTION

The present invention relates to an optical head device to be provided in optical recording-reproduction apparatuses for recording/reproducing information on or from a recording medium such as an optical disk.

BACKGROUND OF THE INVENTION

Optical head devices are well known to the art, which record and reproduce information by applying a light beam to a recording medium such as an optical disk. In a commonly used optical head device, a light beam emitted from a semiconductor laser as a light source passes through a diffracting element, and forms a parallel beam of light through a collimating lens. An intensity distribution of the parallel beam of light shows an elliptic shape in its cross section orthogonal to the optical axis, according to the intensity distribution of the light beam emitted from the semiconductor laser. Here, such an intensity distribution of light related to a cross section orthogonal to the optical axis, is hereinafter referred to simply as a cross-sectional intensity distribution. The elliptic cross-sectional intensity distribution is shaped into a substantially circular shape by a shaping prism in order to improve the efficiency of light utilization in the optical head device. The light beam having its cross-sectional intensity distribution shaped into the substantially circular shape, is converged on the recording medium by an object lens.

The light beam reflected from the recording medium (hereinafter referred to simply as a reflected beam) follows a light path in the reverse order to the above-mentioned, and has its cross-sectional intensity distribution restored to be an elliptic shape by the shaping prism. Thereafter, the reflected beam is directed to a diffracting element via the collimating lens, and diffracted by the diffracting element so as to be converged on a photodetector.

Normally, each of the diffracting element and the photodetector is divided into a plurality of regions by a plurality of division lines so as to obtain a focus error signal or a tracking error signal by adopting the knife-edge method or push-pull method. For example, in accordance with the knife-edge method, a focus error signal can be obtained by finding a difference of detecting signals released from two detecting regions adjacent to each other in the photodetector.

FIG. 16 shows one example of the FES (Focus Error Signal) curve showing the relationship between the intensity of the focus error signal thus obtained and the amount of the displacement of the optical disk based on the focal point of the object lens taken as a reference. In FIG. 16, a reference point A represents a case without a focus error. The reflected beam hits the diffracting element, and a converging point of the resulting diffracted beam directed to the photodetector varies in its position in front of or behind the photodetector in response to fluctuations of the recording medium from the position causing no focus error. As a result, since a shape of a light spot formed on the photodetector by the reflected beam is reversed, the value of the focus error signal is reversed from positive to negative in accordance with the amount of the displacement of the recording medium.

In this case, as shown in FIG. 16, when the recording medium moves away from the focal point of the object lens to a certain extent, an undesired zero-cross point B appears on the FES curve at a position other than the reference point A. Especially in an optical head device using a shaping prism in its optical system, an undesired zero-cross point may appear within a dynamic range of focusing control, depending on what arrangement is selected with respect to the optical system. This is related to the fact that the fluctuation of the recording medium causes the shaping prism to have astigmatism.

Meanwhile, the zero-cross point in the FES curve provides a drive target for the object lens in focus servo control, and if a zero-cross point B appears at a position other than the reference point A as described above, the following problems arise. When focusing control is performed so as to move the object lens from a farther position toward a closer position with respect to the optical disk, for example, in the case of occurrence of an excessive focus error due to an external cause or an initial state of the device, the object lens might be moved to focus on an incorrect target caused by the undesired zero-cross point B. As a result, normal information recording or reproduction might not be performed.

Further, besides the above problem that an undesired zero-cross point might appear in the FES curve, the optical head device has another problem that focusing control might be performed improperly due to wavelength variations of the light beam emitted by the semiconductor laser, that is, offsets might occur. In other words, when the wave-length of the light beam emitted from the semiconductor laser varies, the diffraction angle of the diffracted beam to be directed from the diffracting element to the photodetector is caused to change. Since the distance from the diffracting element to the converging point of the diffracted beam does not change, the variation of the diffraction angle results in forming the converging point of the diffracted beam in front of or behind the photodetector. As a result, even if there is no focus error, a bright portion is formed lying on either one of two adjoining detecting regions. The detecting region having the bright portion generates a detection signal. Therefore, an offset occurs since the value of the focus error signal does not become zero when it should be zero.

SUMMARY OF THE INVENTION

It is an object of the present invention to provide an optical head device wherein focusing control for converging light on a recording medium according to a focus error signal is always performed accurately and whereby high accuracy in recording or reproducing information is obtainable.

It is another object of the present invention to provide an optical head device wherein offsets in focusing control due to wave-length variation of light to be converged on a recording medium can be suppressed.

It is a further object of the present invention to provide an optical head device wherein a zero-cross point of the focus error signal indicates only a state where there is no focus error.

It is a still further object of the present invention to provide an optical head device wherein alleviated tolerances are available for the installation position of a diffracting element to be installed in the optical head device.

In order to achieve the above objects, the optical head device of the present invention is characterized in comprising at least the following means:

(1) light generation means (for example, a laser light source) for generating light having the following features, (a) and (b):
   (a) having an intensity distribution showing a substantially elliptic shape in the cross section orthogonal to the optical axis.
   (b) the major axis of the above elliptic shape being parallel to a reference direction.
(2) photodetecting means (for example, a photodetector) having the following features, (c), (d), and (e)
   (c) releasing detection signals so as to obtain a focus error signal.
   (d) including a plurality of photodetecting sections formed by a plurality of division lines dividing a light-receiving face thereof.
   (e) setting at least one of the plurality of division lines to be substantially parallel to the reference direction.
(3) diffraction means (for example, a diffracting element) having the following features, (h) and (i):
   (h) including a plurality of diffracting regions formed by a plurality of division lines dividing a diffracting face thereof.
   (i) setting at least one of the plurality of division lines for dividing the diffracting face to be parallel to the reference direction.
(4) optical means (such as a collimating lens, a shaping prism and an object lens) having the following features, (j) and (k):
   (j) converging the light emitted from the light generation means on a recording track formed on the recording medium.
   (k) directing reflected light from the recording track to the diffraction means so that the major axis of an elliptic bright portion formed on the diffracting face by the reflected light may be positioned on at least one of the division lines in the diffraction means, the division line being parallel to the reference direction.

Here, the provisions are made such that, when the reflected light that has been diffracted by at least one of the diffracting regions of the diffraction means is converged on at least one of the division lines in the photodetecting means, which is parallel to the reference direction, a value of the focus error signal is allowed to become zero.

In the above arrangement, the light generation means projects light whose intensity distribution has an elliptic shape with its major axis parallel to the reference direction, and at least one of the division lines of the diffraction means is set to be parallel to the reference direction. Thus, the reflected light directed to the diffraction means forms an elliptic bright portion whose major axis is situated on the division line of the diffraction means. Provided that there is no focus error and further there is no wave-length variation with respect to light generated by the light generation means, the diffraction means diffracts reflected light that has directed to at least one of the diffracting regions so that the reflected light may be converged on at least one of the division lines in the photodetecting means, which is substantially parallel to the reference direction. At this time, the value of the focus error signal obtained based on detection signals released by the respective photodetecting sections is permitted to become "0".

On the other hand, occurrence of a wave-length variation in the light generated by the light generation means causes a variation in the diffraction angle of the reflected light directed to the diffraction means. This causes the position of a converging point, which was on the light-receiving face of the photodetecting means in the case where there is no focus error and further there is no wave-length variation with respect to the light generated by the light generation means, to vary in a direction orthogonal to and parallel to the light-receiving face. As a result, in the vicinity of at least one of the division lines which is substantially parallel to the reference direction in the photodetecting means, is formed a thin semi-elliptic bright portion whose major axis of the elliptic shape is parallel to the division line. In other words, even in the case of no focus error, if there is a wave-length variation, the value of the focus error signal does not become "0" due to the thin semi-elliptic bright portion formed in the photodetecting means.

However, an offset value of the focus error signal caused by the wave-length variation is extremely suppressed because of the facts that detection sensitivity is low in the vicinity of the division lines in the photodetecting means; and the bright portion formed by the photodetecting means lies in a thin shape along the division line.

Moreover, the bright portion formed on the diffracting face of the diffraction means, derived from the reflected light, has an elliptic shape whose minor axis is orthogonal to the reference direction. In the case where the optical means include an intensity distribution shaping means for shaping an intensity distribution of the light emitted by the light generation means in the minor axis direction of its elliptic shape, the shape of the bright portion formed on the diffracting face changes depending on changes in amount of focus error. A rate of change in the minor axis direction becomes greater than that in the major axis direction. With the arrangement, in conjunction with the shape of the bright portion formed on the photodetecting means, a rate of change with respect to the minor axis direction becomes greater than that with respect to the major axis direction, resulting in abrupt changes in the focus error signal. Therefore, response sensitivity in the focusing control can be improved.

On the other hand, when the optical means include intensity distribution shaping means for shaping an intensity distribution of the light emitted by the light generation means in the major axis direction of its elliptic shape, a rate of change caused by a focus error with respect to the minor axis direction becomes smaller than the case described above, in conjunction with the shape of the bright portion formed on the diffracting face. Therefore, unless the recording medium moves too far away from the position where there is no focus error, for example, as far as several millimeters therefrom, it is avoided that the reflected light forms a bright portion having a line-like shape on the diffraction means. The displacement of the recording medium in the order of several millimeters is virtually negligible in actual focusing control. Consequently, with this arrangement, in addition to advantages of suppressing offsets in focusing control and improvement in response sensitivity, it is avoidable to have an undesired zero-cross point which appears due to an undesired inversion of the value of the focus error signal caused by the fact that a line-like bright portion is formed on the diffracting face. Thus, optimum focusing control can be performed.

Additionally, instead of the above arrangement shown by (1)-(b) and (4)-(K), another arrangement is adoptable, wherein the minor axis of the elliptic shape is set to be parallel to the reference direction, and the optical means is designed to direct the reflected light to the diffraction means so that the minor axis of the elliptic bright portion formed on the diffracting face may be positioned on at least one of the division lines parallel to the reference direction in the diffracting means.

In the above arrangement, the reflected light directed to the diffraction means forms an elliptic bright portion whose major axis is orthogonal to the division line parallel to the reference direction of the diffraction means. In this case, even if the division line of the diffraction means slightly deviates from the optical axis, or slightly tilts with respect to the reference direction, the function of the diffraction means for diffracting the reflected light so as to converge it on the photodetecting means is little adversely affected. Therefore, in the optical pick-up device in accordance with the present invention, tolerances in the installation position of the diffracting element are alleviated, and the installation work for the diffracting element is simplified.

Moreover, under the above-mentioned conditions, even if a bright portion having a line-like shape is formed on the diffracting element due to a focus error, the line-like bright portion is formed in a direction orthogonal to the division line of the diffraction means. Therefore, it is avoidable to have the phenomenon that the focus error signal is undesirably inverted before and after the process wherein the line-like bright portion is formed, and a state where the value of the focus error signal shows zero, is always allowed to indicate the fact that there is no focus error.

For a fuller understanding of the nature and advantages of the invention, reference should be made to the ensuing detailed description taken in conjunction with the accompanying drawings.

DESCRIPTION OF THE EMBODIMENT

Referring to FIGS. 1 to 4, the following description will discuss one embodiment of the present invention.

Figure 1:
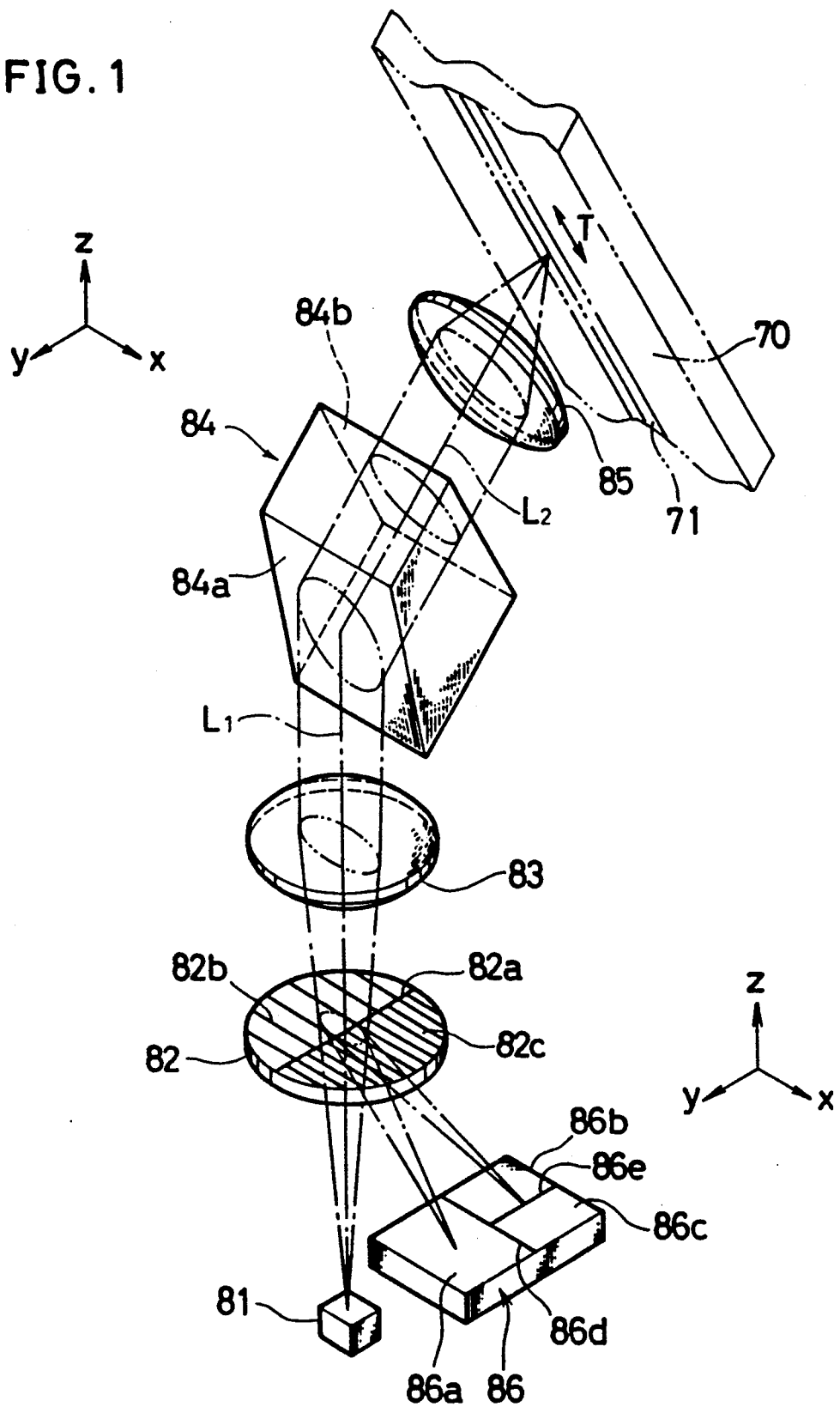
FIG. 1 is a perspective view showing a structural example of an optical head device according to the present invention.
Figure 3:
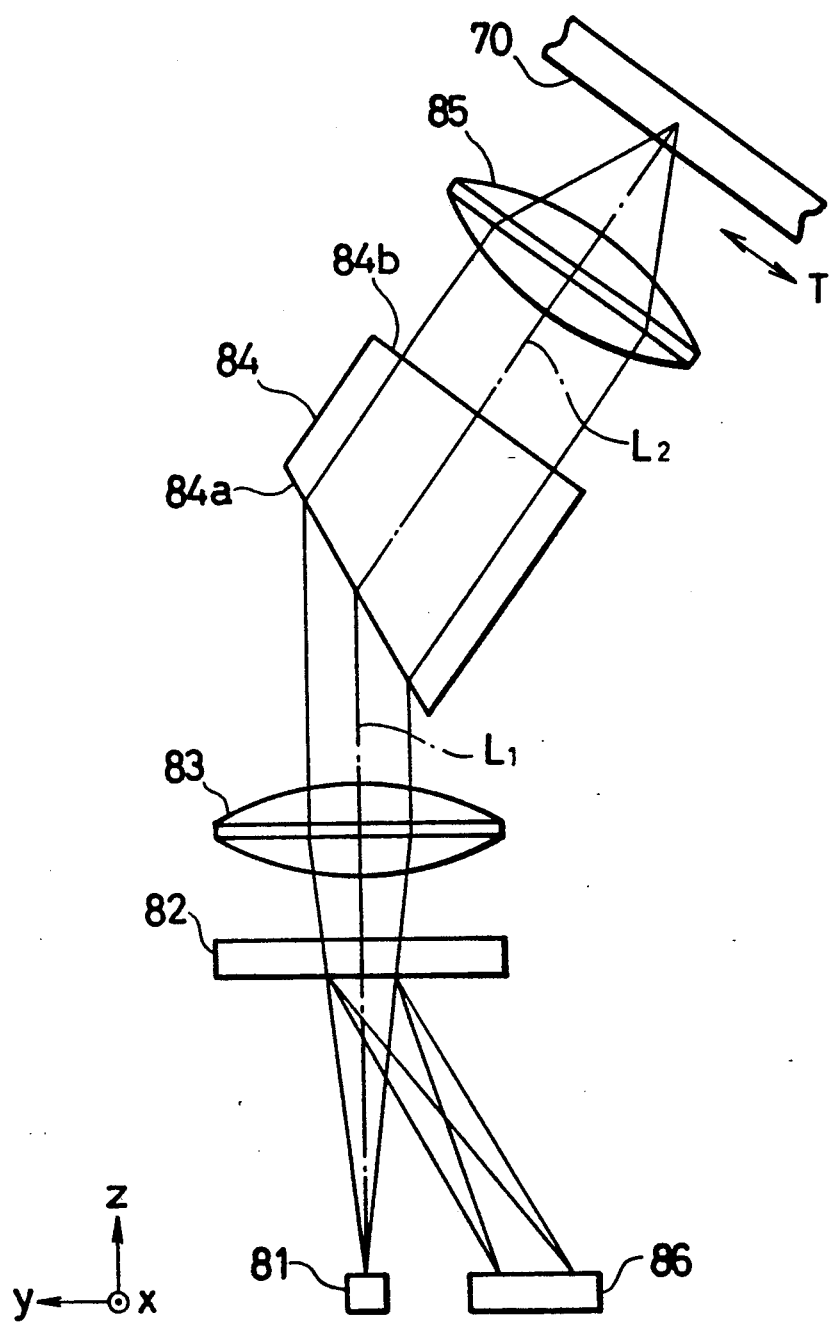
FIG. 3 is a side view of the optical head device shown in FIG. 1.

First, as shown in FIGS. 1, three axis rectangular coordinates x-y-z are determined as follows in conjunction with an optical head device of the present invention. Here, a state where a light beam is properly focused on a recording medium by means of the optical head device during a recording or reproducing process, is referred to as a just-in-focus state. The z-axis is determined to be parallel to an optical axis $L_1$ of a light beam emitted from a laser light source 81 employing, for example, a semiconductor laser as light generation means. The y-axis is determined to be orthogonal to the z-axis and further parallel to a hypothetical line extending through a projecting point of the laser light source 81 and a converging point formed on the photodetector 86 in the just-in-focus state, while the x-axis is determined to be orthogonal to both the y and z-axes. Additionally, the y-axis can be determined so as to be parallel to a division line 82a of a diffracting element 82, which are described later. The direction parallel to the y-axis is hereinafter referred to as a reference direction. Further, directions as indicated by arrows of the respective x, y and z-axes in FIGS. 1 are supposed to be the respective positive directions. Additionally, FIG. 3 is a side view of the optical head device of FIG. 1, seen from the positive side toward the negative side along the x-axis.

A light beam emitted by the oscillation of the laser light source 81 gradually spreads to have an intensity distribution of an elliptic shape in its cross section orthogonal to the optical axis $L_1$. (Additionally, such an intensity distribution of light, related to a cross section orthogonal to the optical axis, is hereinafter referred to simply as a cross-sectional intensity distribution.) Here, the laser light source 81 is arranged so that the major axis of the elliptic shape is orthogonal to the y-axis, that is, the reference direction.

Moreover, respective centers of the diffracting element 82, a collimating lens 83 and an end face 84a of a shaping prism 84 are aligned along the optical axis $L_1$. Here, the end face 84a is a surface to receive the light beam emitted by the laser light source 81. The diffracting element 82 for transmitting the light beam emitted by the laser light source 81 is of a disc shape, square shape, elliptic shape, etc. whose surfaces are parallel to the x-y plane. The light beam transmitted through the diffracting element 82 passes through the collimating lens 83. At this time, the collimating lens 83 produces a parallel beam of light from the light beam spreading in the shape of cone, directed thereto. Similarly, a cross-sectional intensity distribution of the parallel beam of light projected from the collimating lens 83 shows an elliptic shape whose major axis is orthogonal to the y-axis, that is, the reference direction.

The parallel beam of light projected from the collimating lens 83 is directed to the end face 84a of the shaping prism 84. The end face 84a is inclined with respect to the x-z plane and x-y plane. Therefore, the intensity distribution of the parallel beam of light is diffused in the minor axis direction by the end face 84a to form a substantially round shape. The parallel beam of light having impinged upon the shaping prism 84 proceeds along the optical axis $L_2$ in the shaping prism 84 and is projected from the other end face 84b. As shown in FIG. 3, since the end face 84b is orthogonal to the optical axis $L_2$, the parallel beam of light is projected from the end face 84b in a direction parallel to the optical axis $L_2$ and directed to the object lens 85.

The object lens 85 is disposed so as to have its optical axis coincided with the optical axis $L_2$, and converges the parallel beam of light on a recording track 71 formed in a belt-like shape on an optical disk 70 as a recording medium. A recording surface of the optical disk 70 is placed perpendicular to the optical axis $L_2$. A tangent direction to the rotatable recording track 71 at a converging point is represented by an arrow T in the drawing. Additionally, the tangent direction T is parallel to the y-z plane. This tangent direction can be expressed in different words as microscopic rotation direction at a converging point on the recording track 71. As to the optical disk 16, any type thereof is selectable among read-only type, direct-read-after-write type, rewritable type, and so on, according to each purpose.

The object lens 85 is moved closer to or farther away from the optical disk 70 so that the focal point of the object lens 85 is positioned on the track 71 (that is, brought in the just-in-focus state). Further, the object lens 85 is also moved in a radial direction of the optical disk 70. Additionally, the radial direction is orthogonal to the tangent direction T.

The light beam reflected from the recording track 71 (hereinafter referred to simply as the reflected beam) successively passes through the object lens 85, shaping prism 84 and collimating lens 83 following in the reverse order the path whereby the light beam was directed to the recording track 71. The reflected beam having passed through the shaping prism 84 forms a parallel beam of light. The reflected beam projected from the end face 84a has its intensity distribution returned from the round shape to an elliptic shape. Further, the reflected beam is directed to the diffracting element 82 by the collimating lens 83 along the path converging on the projecting point of the laser light source 81.

Figure 2:
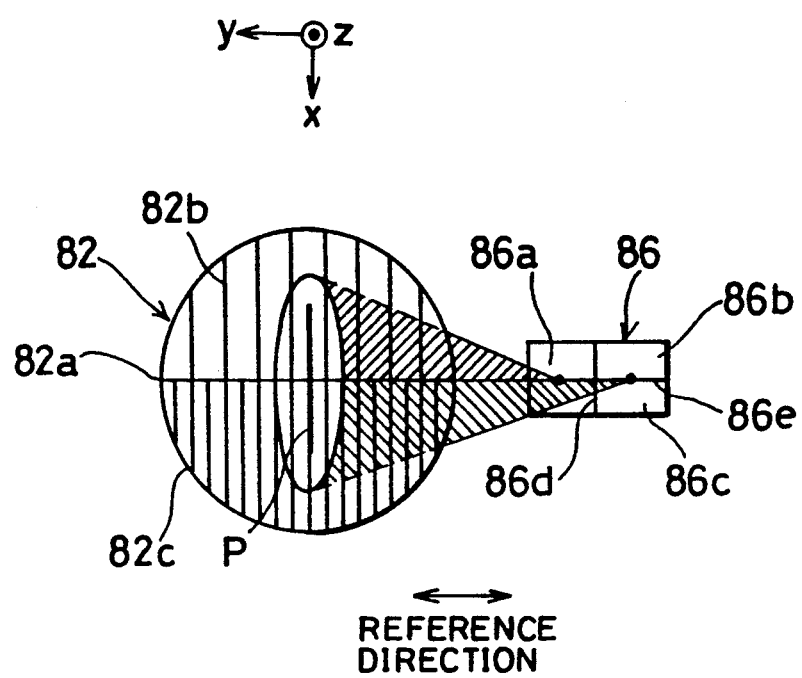
FIG. 2 is a schematic plan view of a diffracting element and a photodetector shown in FIG. 1.

FIG. 2 shows the diffracting element 82, laser light source 81 and photodetector 86 of FIG. 1, seen from the positive side toward the negative side along the z-axis. The diffracting face of the diffracting element 82 is equally divided into two regions by a division line 82a parallel to the y-axis, that is, the reference direction. The reflected beam returned to the diffracting element 82 forms on the diffracting element 82 an elliptic bright portion whose major axis is parallel to the x-axis and orthogonal to the division line 82a and whose minor axis substantially coincides with the division line 82a parallel to the y-axis. The diffracting regions separated by the division line 82a are provided with respective first and second diffraction gratings 82b and 82c. Grating lines formed on each diffraction grating 82b or 82c have a predetermined pitch and are orthogonal to the division line 82a, that is, form a number of parallel lines extending in the x-direction. Moreover, the pitch of the grating lines in the first diffraction grating 82b is set to be greater than that in the second diffraction grating 82c. With the above arrangement, as shown in FIG. 1, each diffracting grating 82b or 82c diffracts a part of the reflected beam directed thereto in a direction substantially parallel to the y-z plane including the division line 82a. Here, a diffraction angle with respect to the part of the reflected beam diffracted by the first diffraction grating 82b toward the photodetector 86 (hereinafter referred to simply as the first diffracted beam) is set to be smaller than that with respect to another part of the reflected beam diffracted by the second diffraction grating 82c toward the photodetector 86 (hereinafter referred to simply as the second diffracted beam).

The diffracted beams are directed to the photodetector 86 which is disposed beside the laser light source 81 in the negative direction of the y-axis. The photodetector 86 has a photodetecting face whereon these diffracted beams are projected. The photodetecting face is equally divided into two regions by a first division line 86d parallel to the x-axis. One of the photodetecting regions positioned by the side of the laser light source 81 is referred to as a first detecting region 86a. The other photodetecting region is further equally divided into two detecting regions, that is, a second detecting region 86b and a third detecting region 86c by a second division line 86e which is substantially parallel to the y-axis. The detecting regions 86a, 86b, 86c respectively generate detection signals according to intensities of the respective diffracted beams directed thereto.

In the above arrangement, when a light beam having a reference wave-length emitted from the laser light source 81 is converged on the optical disk 70 in the just-in-focus state, the resulting reflected beam from the optical disk 70 is diffracted by the diffraction grating 82b and 82c so as to be divided into two parts, which are respectively diffracted with different diffraction angles. The first diffracted beam derived from the first diffraction grating 82b is diffracted with a smaller angle and converged on a center of the first detecting region 86a. On the other hand, the second diffracted beam derived from the second diffraction grating 82c is diffracted with a greater angle and converged on a center of the second division line 86e.

Suppose that detection signals released from the first to third detecting regions 86a, 86b and 86c are represented respectively as Sa, Sb and Sc. Then, a focus error signal FES for use in focusing control for the light beam to be directed to the optical disk 70 is obtained by calculating a difference of the detection signals from the second detecting region 86b and third detecting region 86c, that is, Sb−Sc. The object lens 85 is moved closer to or father away from the optical disk 70 so as to make the value of the focus error signal become zero. Thus, the light beam is projected on the optical disk 70 in the just-in-focus state.

On the other hand, a radial error signal RES is obtained by the calculation of Sa−(Sb+Sc). The object lens 85 is shifted in a radial direction of the optical disk 70 so that the value of FES may become zero. Further, a reproduction signal RF for information recorded on the optical disk 70 is obtained by the calculation of Sa+Sb+Sc.

Figure 4:
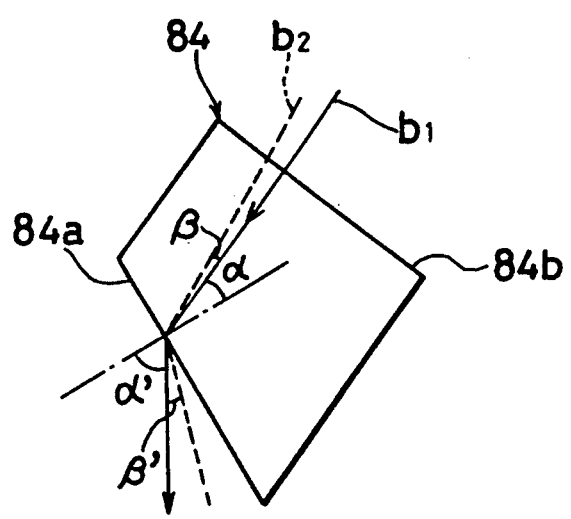
FIG. 4 is an explanatory drawing showing an optical function of a shaping prism.

In the optical head device with the shaping prism 84, as shown in FIG. 2, a line-like bright portion may be formed on the diffracting element 82 (shown by a heavy line P in FIG. 2). This phenomenon occurs due to the astigmatism of the shaping prism 84 when the optical disk 70 is fluctuated to move away from the focal point of the object lens 85. The following description will discuss the phenomenon in detail. In the optical head device shown in FIG. 1, a reflected beam which is produced from the light beam focused on the optical disk 70 is transmitted through the shaping prism 84 and projected therefrom in a manner as shown by a solid line in FIG. 4. In FIG. 4, suppose the reflected beam b: from the optical disk 70 hits the end face 41 of the shaping prism 84 at an angle $\alpha$ from the collimating lens 83 side, and let us denote an angle of refraction of the reflected beam $b_1$ by $\alpha'$ and a refractive index of the shaping prism 84 by n. Then using Snell's Law, the following equation holds:

$$n \cdot \sin \alpha = \sin \alpha'. \quad (1)$$

Suppose a light beam directed onto the optical disk 70 has a focus error, thereby causing a reflected beam $b_2$ from the optical disk 70 to tilt with respect to the reflected beam $b_1$. Further, a difference of an incident angle of the reflected beam $b_2$ and the incident angle $\alpha$ of the reflected beam $b_1$ with respect to the end face 84a is denoted by $\beta$, and a difference of an angle of refraction of the reflected beam $b_2$ and the angle of refraction $\alpha'$ of the reflected beam $b_1$ is denoted by $\beta'$. Then, a relationship between $\beta$ and $\beta'$ is given by the following equation:

$$\beta' = \sin^{-1}(n \cdot \sin \alpha) - \sin^{-1}\{n \cdot \sin(\alpha - \beta)\}. \quad (2)$$

The equation (2) shows that the difference $\beta'$ in the angles of refraction of the respective reflected beams at the end face 84a of the outgoing side is amplified in comparison with the difference $\beta$ when there occurs a focus error in the light beam to be projected on the optical disk 70. In other words, rate of change (that is, rate of enlargement or rate of reduction) at which the shape of the bright portion formed on the diffracting element 82 by the reflected beam varies with the amount of the focus error is amplified with respect to the shaping direction along which the shaping prism 84 diffracts or condenses the cross-sectional intensity distribution. That is, in the case of the bright portion shown in FIG. 2, the shaping direction of the cross-sectional intensity distribution is parallel to the minor axis of the elliptic shape, that is, the y direction. Therefore, the rate of change with respect to the y direction of the shape of the bright portion becomes greater than that with respect to the x direction thereof. Thus, when the focus error becomes great to a certain extent, a line-like bright portion P is formed lying in a direction orthogonal to the division line 82a. This is because the shaping prism 84 has astigmatism which causes the reflected beam to have different converging positions between the minor axis direction and the major axis direction of the cross-sectional intensity distribution.

The line-like bright portion P may be formed overlapping on the division line 82a depending on the alignment of optical members constituting the optical head device, or it may be formed biasing onto the first diffraction grating 82b due to an installation error of the diffracting element 82 or other reasons. In this case, outputs of the detecting regions 86b and 86c become "0". As a result, since the value of the focus error signal FES shows "0" in spite of the presence of a focus error, an offset occurs in focusing control. However, with the advantageous arrangement that the line-like bright portion P is formed so as to be orthogonal to the division line 82a, even if the division line 82a slightly tilts with respect to the x-axis, or slightly deviates from the optical axis, those factors have little adverse effects on the requirement that the bright portion P should be evenly allotted onto the regions 82b and 82c, thereby making it possible to obtain an appropriate focus error signal FES. Therefore, the optical head device with the above arrangement makes it possible to lessen the accuracy required for the installation of the diffracting element 82.

Further, there is another advantage in the arrangement that the elliptic bright portion to be formed on the diffracting element 82 has its major axis set to be orthogonal to the division line 82a. That is, as the optical disk 70 moves farther away from the focal point of the object lens 85, the shape of the elliptic bright portion is inverted with respect to the y direction parallel to the division line 82a with the formation of the line-like bright portion P as a turning point of the inversion; however, the shape thereof is not inverted with respect to the x direction orthogonal to the division line 2a. As a result, in the photodetector 86, there occurs no such phenomenon that a semi-elliptic bright portion is inverted between the detecting region 86b and 86c (The value of the focus error signal FES undesirably shows "0" also in the case where a light spot first formed either on the detecting region 86b or 86c is then reversed in its position onto the other detecting region 86b or 86c). As described above, in the optical head device shown in FIG. 1, its focusing control is little adversely affected by fluctuations of the optical disk 70.

Figure 7:
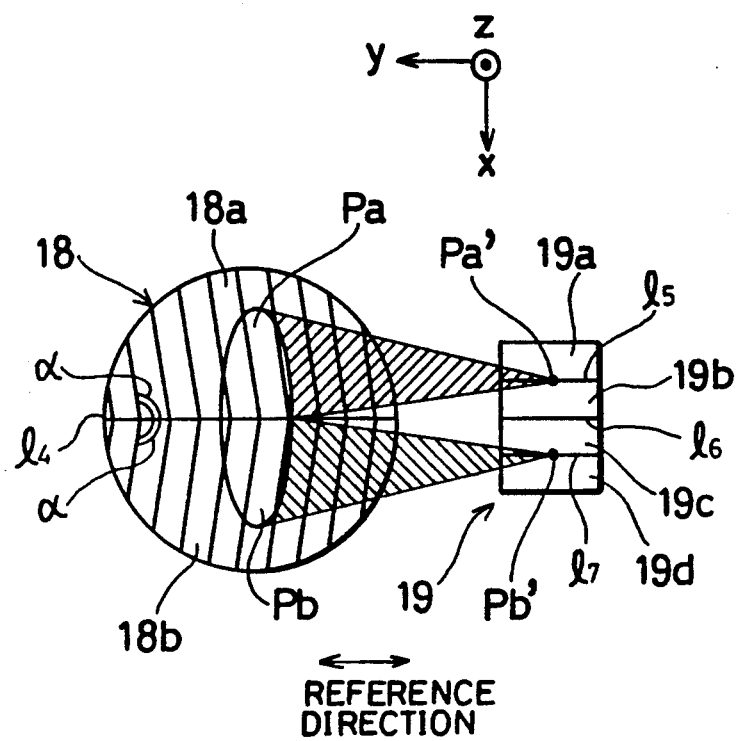
FIG. 7 is a schematic plan view of a diffracting element and a photodetector in another structural example of an optical head device of the present invention.

FIG. 7 shows the second embodiment.

As with the first embodiment, a diffracting element 18 is divided into two diffraction gratings 18a and 18b by a division line l₄ parallel to the x-axis. However, grating lines formed in the respective diffraction gratings 18a and 18b are not orthogonal to the division line l₄ but slightly tilted with respect thereto. Grating lines formed in the respective diffraction gratings 18a and 18b make the same obtuse tilt angle $\alpha$ with respect to the y-axis in the negative direction. Additionally, as with the first embodiment, the minor axis of an elliptic bright portion formed on the diffracting element 18 is set to be parallel to the y-axis, that is, the reference direction.

Figure 6:
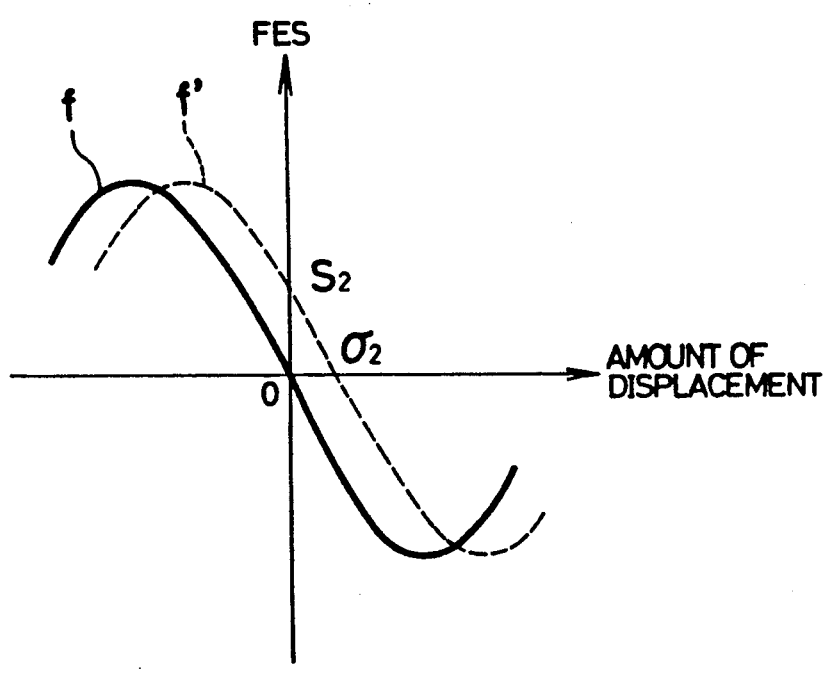
FIG. 6 is a graph showing the relationship between the amount of displacement of the optical disk, shown in FIG. 1, based on a focal point of an object lens as a reference and the variation of intensity of a focus error signal FES.

On the other hand, a photodetector 19 is divided into four photodetecting regions 19a, 19b, 19c and 19d by three division lines $l_5$, $l_6$ and $l_7$, each of which is substantially parallel to the division line $l_4$ (e.g., see pages 162 and 163 together with FIG. 6 of "CD Optical Pickup using a Computer Generated Holographic Optical element" in Optical Storage and Scanning Technology, Tony Wilson, Editor, Proc. SPIE 1139, p161-168, (989) by Yukio Kurata, et al.) Thus, the reflected beam directed from the optical disk 16 are diffracted by the respective diffraction gratings 18a, 18b of the diffracting element 18 to form respective light spots Pa' and Pb' on the photodetector 19. In this case, the installation position of the photodetector 19 is determined as follows:

(a) The division line $l_6$ is positioned within a plane containing both the z-axis and the division line $l_4$.

(b) In the case of no focus error, the light spots Pa' and Pb' are formed respectively on the division lines $l_5$ and $l_7$.

Additionally, the arrangement is the same as that of the first embodiment except the diffracting element 18 and the photodetector 19.

In the second embodiment, when detection signals released from the photodetecting regions 19a, 19b, 19c and 19d are represented respectively as Sa, Sb, Sc and Sd, a reproduction signal RF, a focus error signal FES and a radial error signal RES by the use of the push-pull method are obtained by respective calculations according to the following equations:

$$RF = Sa + Sb + Sc + Sd \quad (4)$$

$$FES = (Sa - Sb) + (Sd - Sc) \quad (5)$$

$$RES = (Sa + Sb) - (Sc + Sd) \quad (6)$$

In this embodiment, there is no appearance of a zero-cross point in the FES curve in any state except in the just-in-focus state.

However, such a laser light source 81 employed in the above-mentioned optical head device shown in FIGS. 1 and 7, for example, a semiconductor laser, has a property that a wave-length of its projecting light beam varies depending on ambient temperature changes. Further, a diffraction angle of a light beam diffracted by a diffraction grating varies depending on its wave-length. In other words, the diffraction angle becomes greater as the wave-length of the light beam becomes longer. Therefore, the wave-length fluctuations of the light beam cause the accuracy of the focusing control to lower with respect to each of the optical head devices described above. This will be discussed in detail hereinbelow.

For example, as shown in FIG. 5(b), when a light beam with a reference wave-length $\lambda_0$ emitted from the laser light source 81 is converged on the optical disk 70 in the just-in-focus state and reflected therefrom, a part of the resulting reflected beam directed to the first diffraction grating 82b is diffracted to be converged onto a center $O_1$ of the first detecting region 86a of the photodetector 86 to form a light spot. On the other hand, another part of the reflected beam directed to the second diffraction grating 82c is diffracted to be converged onto a center $O_2$ of the second division line 86e of the photodetector 86 to form a light spot. In this case, the value of the focus error signal FES becomes "0".

Meanwhile, in the case where the optical disk 70 is fluctuated with respect to the object lens 85 and a light beam having the reference wave-length $\lambda_0$ projected on the optical disk 70 is not in the just-in-focus state, the focus error signal FES has an intensity responsive to an amount of displacement of the optical disk 70 from a focal point of the object lens 85 as a reference as shown by a solid line f in FIG. 6.

Here, suppose that ambient temperature has risen with respect to the laser light source 81, a wave-length $\lambda$ of a light beam emitted from the laser light source 81 becomes longer than the reference wave-length $\lambda_0$. In this case, even if the light beam is projected on the optical disk 70 in the just-in-focus state, the resulting reflected beam reflected from the optical disk 70 and directed to the diffracting element 82 is diffracted with a greater angle than that of the reflected beam having the reference wave-length $\lambda_0$ as described earlier. For this reason, the resulting diffracted beams to be directed from the diffracting element 82 to the photodetector 86 have longer optical path lengths, and therefore, the diffracted beams are focused in front of the detecting face of the photodetector 86 before reaching them. As a result, as shown in FIG. 5(a), one of the beams diffracted by the first diffraction grating 82b is projected on the first detecting region 86a to form a semi-elliptic bright portion $P_1$ lying in the positive direction of the x-axis. On the other hand, the other beam diffracted by the second diffraction grating 82c is projected on the second detecting region 86b to form a semi-elliptic bright portion $P_2$ lying in the negative direction of the x-axis. The bright portions $P_1$ and $P_2$ are respectively positioned away from the center $O_1$ of the first detecting region 86a and the center $O_2$ of the second division line 86e in the departing direction from the laser light source 81. Further, as described earlier, the bright portions $P_1$ and $P_2$ are opposite to each other in their shapes with their respective major axes being parallel to the first division line 86d, that is, the x-axis.

Next, suppose that ambient temperature has dropped with respect to the laser light source 81, a wave-length $\lambda'$ of a light beam emitted from the laser light source 81 becomes shorter than the reference wave-length $\lambda_0$. In this case, the beams diffracted by the respective diffraction gratings 82b and 82c have smaller diffraction angles. For this reason, the beams with the wave-length $\lambda'$, after having been diffracted by the respective diffraction gratings 82b and 82c, are focused behind the detecting regions of the photodetector 86. As a result, as shown in FIG. 5(c), one of the beams diffracted by the first diffraction grating 82b is projected on the first detecting region 86a to form a semi-elliptic bright portion $P_1'$ lying in the negative direction of the x-axis. The shape of the bright portion $P_1'$ has an opposite orientation to that of the bright portion $P_1$. On the other hand, the other beam diffracted by the second diffraction grating 82c is projected on the second detecting region 86c to form a semi-elliptic bright portion $P_2'$ lying in the positive direction of the x-axis. Similarly, the shape of the bright portion $P_2'$ has an opposite orientation to that of the bright portion $P_2$. The bright portions $P_1$ and $P_2$ are respectively positioned away from the center $O_1$ of the first detecting region 86a and the center $O_2$ of the second division line 86e in the approaching direction to the laser light source 81.

As described earlier, the cross-sectional intensity distribution of the reflected beam directed to the diffracting element 82 shows an elliptic shape whose major axis is orthogonal to the division line 82a, that is, the y-axis, and further is equally allotted to the diffraction gratings 82b and 82c. Therefore, the reflected beam with the wave-length $\lambda$ or $\lambda'$ having a variation from the reference wave-length $\lambda_0$ is diffracted by the diffracting element 82 to form on the respective detecting regions of the photodetector 86 the bright portions $P_1$ and $P_2$ or $P_1'$ and $P_2'$ which show semi-elliptic shapes with their respective major axes orthogonal to the y-axis.

Thus, for example, in the case where the wave-length $\lambda$ of a light beam is greater than the reference wave-length $\lambda_0$, even if the light beam is projected on the optical disk 70 in the just-in-focus state, the second detecting region 86b releases the detection signal Sb based on the intensity of the bright portion $P_2$ shown in FIG. 5(a). As a result, despite the fact that the optical disk 70 is situated at an appropriate position with respect to the object lens 85, a focus error signal FES (=Sb−Sc) having a value of $S_2(>0)$ is produced as is shown by a broken line f' in FIG. 6. The focus error signal FES having a positive value indicates that the optical disk 70 is fluctuated to approach the object lens 85. Therefore, in order to make the value of the focus error signal FES set to "0", the object lens 85 is moved so that the optical disk 70 may be located away from the focal point of the object lens 85 by an offset value $\pi_2$. This causes the light beam to be focused before reaching the optical disk 70, thereby disturbing an accurate recording or reproducing operation for information.

In order to solve the above problem, the third embodiment of an optical head device wherein the wavelength fluctuations of the light beam have little adverse effects on its focusing control will be discussed hereinbelow. For convenience of explanation, those of the members having the same functions as those shown in FIG. 1 of the first embodiment are indicated by the same reference numerals and the description thereof is omitted.

Figure 8:
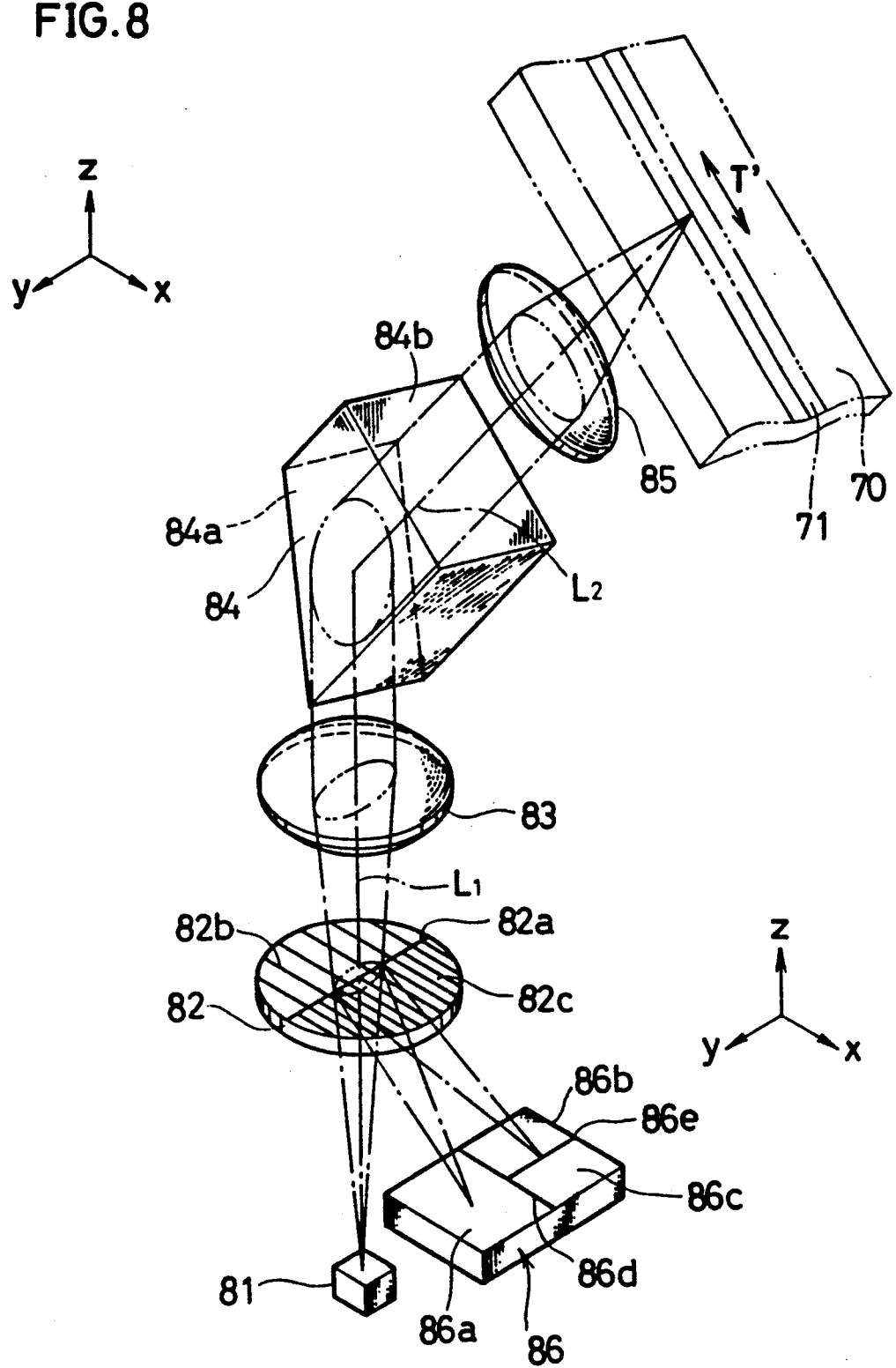
FIG. 8 is a perspective view showing still another structural example of an optical head device according to the present invention.
Figure 9:
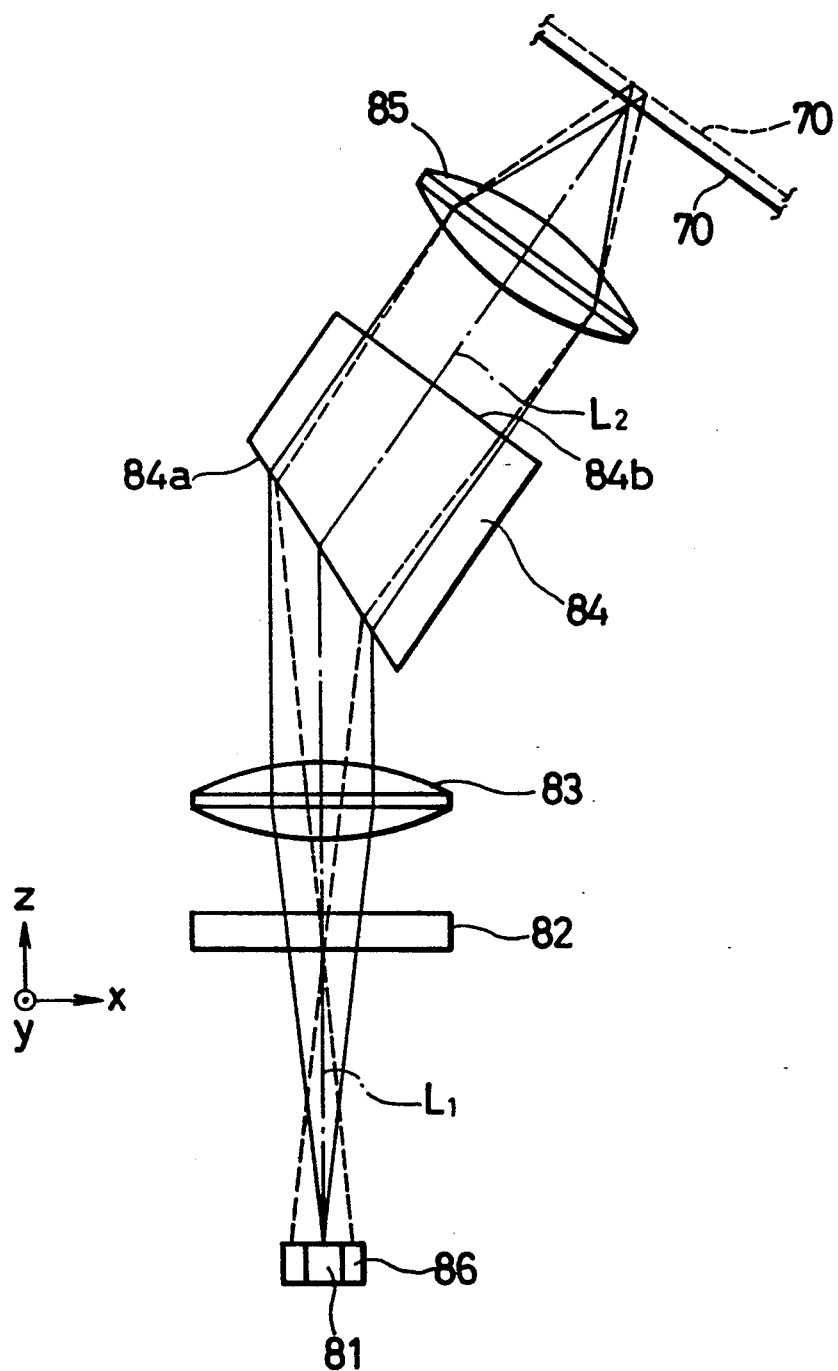
FIG. 9 is a side view of the optical head device shown in FIG. 8.

As shown in FIGS. 8 and 9, the optical head device of the third embodiment is constituted of the same optical members as the optical head device of the first embodiment (FIG. 9 is a side view of the optical head device of FIG. 8 seen from the positive side toward the negative side along the y-axis). Here, the laser light source 81 of the present embodiment emits a light beam having an cross-sectional intensity distribution of an elliptic shape whose major axis is parallel to the y-axis, that is, a reference direction, in an opposite manner to the first embodiment. Further, the shaping prism 84 of the present embodiment is disposed at a position obtained by turning the position of the shaping prism 84 of the first embodiment around the z-axis by 90 degrees in order to shape the cross-sectional intensity distribution of the elliptic shape with respect to the minor axis direction. Therefore, the end face 84a is tilted with respect to the x-y plane as well as the y-z plane. Further, the recording surface of the optical disk 70 is disposed in a direction perpendicular to the optical axis $L_2$ of the object lens 85, which is the same arrangement as the above-mentioned embodiment; however, a tangent direction T' at a converging point on the rotating recording track 71 is parallel to the x-z plane.

Figure 10:
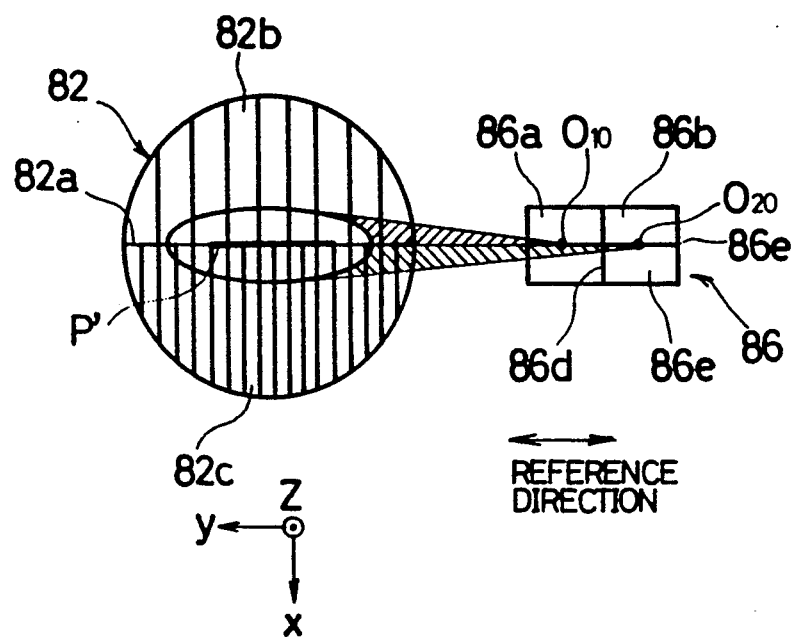
FIG. 10 is a schematic plan view of a diffracting element and a photodetector shown in FIG. 8.

FIG. 10 shows a plan view of the diffracting element 82 and the photodetector 86. As shown in FIG. 10, according to the above arrangement, the major axis of the elliptic bright portion formed on the diffracting element 82 by the reflected beam directed thereto from the optical disk 70 is positioned substantially on the division line 82a. When a light beam having a reference wave-length $\lambda_0$, emitted from the laser light source 81 is converged on the recording track 71 in the just-in-focus state, the resulting reflected beam from the recording track 71 is diffracted by the diffraction grating 82a and 82b so as to be divided into two parts. Then, the first diffracted beam is converged on a center $O_{10}$ of the first detecting region 86a, while the second diffracted beam is converged on a center $O_{20}$ of the second division line 86e.

Next, the following description will discuss the shapes of the bright portions formed on the photodetector 86 in response to focus errors.

First, as illustrated in FIG. 11(a), in a state where the object lens 85 is located close to the optical disk 70, the second diffracted beam derived from the second diffraction grating 82c having a relatively narrower pitch of grating, forms a bright portion $P_{20}$ on the third detecting region 86c in the vicinity of the center $O_{20}$. The bright portion $P_{20}$ has a semi-elliptic shape lying in the positive direction of the x-axis, and its major axis is parallel to the first division line 86d, that is, the x-axis. On the other hand, the first diffracted beam derived from the first diffraction grating 82b having a relatively wider pitch of grating, forms a bright portion $P_{10}$ in the vicinity of the center $O_{10}$. The bright portion $P_{10}$ has a semi-elliptic shape lying in the negative direction of the x-axis, and its major axis is parallel to the x-axis as with the aforementioned case. Thus, the bright portions $P_{10}$ and $P_{20}$ are substantially opposite to each other in their shapes.

Meanwhile, as illustrated in FIG. 11(b), in a state where the object lens 85 is located far away from the optical disk 70, the second diffracted beam forms a bright portion $P_{21}$ on the second detecting region 86b in the vicinity of the center $O_{20}$. The bright portion $P_{21}$ has a semi-elliptic shape lying in the negative direction of the x-axis, which is opposite to the above-mentioned case having the object lens 85 located close to the optical disk 70, and its major axis is parallel to the x-axis as with the above-mentioned case. On the other hand, the first diffracted beam forms a bright portion $P_{11}$ in the vicinity of the center $O_{10}$ of the first detecting region 86a. Similarly, the bright portion $P_{11}$ has a semi-elliptic shape lying in the positive direction of the x-axis, which is opposite to the above-mentioned case having the object lens 85 located close to the optical disk 70, and its major axis is parallel to the x-axis as with the above-mentioned case. The bright portions $P_{11}$ and $P_{21}$ are substantially opposite to each other in their shapes.

As illustrated in FIG. 11(a), each shape of the bright portions $P_{10}$ and $P_{20}$ is deformed with its center remained the same, according to an amount of displacement of the optical disk 70 based on a focal point of the object lens 85 as a reference. (The same is true with respect to the shapes of the bright portion $P_{11}$ and $P_{21}$) Here it is noted that in the optical head device of the present invention shown in FIG. 8, rate of change of the shapes of the bright portions $P_{10}$ and $P_{20}$ with respect to the x-direction (that is, rate of enlargement or rate of reduction) is greater than rate of change of those in the optical head device shown in FIG. 1.

Referring to FIG. 4, it has already been discussed in the first embodiment that the rate of change at which the shape of the bright portion formed on the diffracting element 82 changes in response to the amount of a focus error is amplified with respect to the shaping direction along which the shaping prism 84 diffuses or condenses the cross-sectional intensity distribution. In the case of a bright portion shown in FIG. 10, the shaping direction of the cross-sectional intensity distribution is parallel to the minor axis of the elliptic shape, that is, the x direction. Therefore, the rate of change with respect to the x direction of the shape of the bright portion becomes greater than that with respect to the y direction thereof. Therefore, since rate of change of the shapes of the bright portions $P_{10}$ and $P_{20}$ with respect to the x direction is greater than rate of change of those with respect to the y direction, each of the bright portions $P_{10}$ and $P_{20}$ has a prolonged semi-elliptic shape lying in the x direction, as shown in FIG. 11(a).

Figure 12:
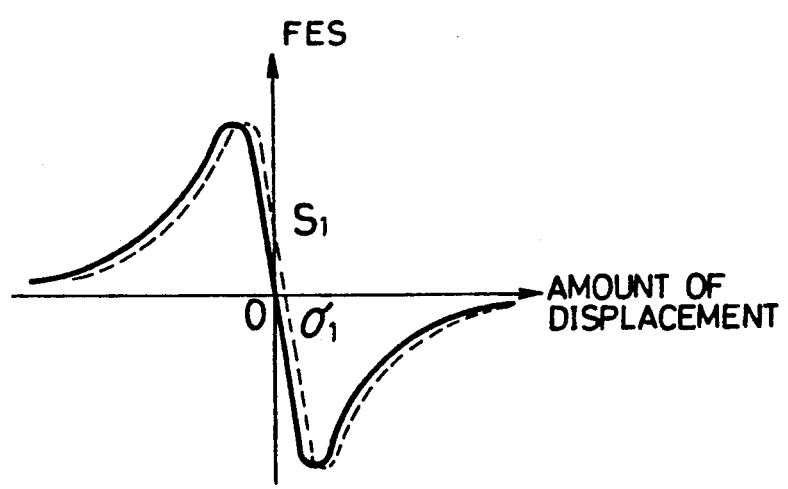
FIG. 12 is a graph showing the relationship between the amount of displacement of the optical disk, shown in FIG. 8, based on a focal point of an object lens as a reference and the variation of intensity of a focus error signal FES.

FIG. 12 shows an example of the FES curve with respect to the optical head device shown in FIG. 8. As described above, the rate of change of the shapes of the bright portions $P_{10}$ and $P_{20}$ formed on the photodetector 86 is great with respect to the x direction orthogonal to the second division line 86e. For this reason, as shown by a solid line in FIG. 12, its FES intensity shows an abrupt change in the vicinity of a zero-cross point on the FES curve.

Figure 5:
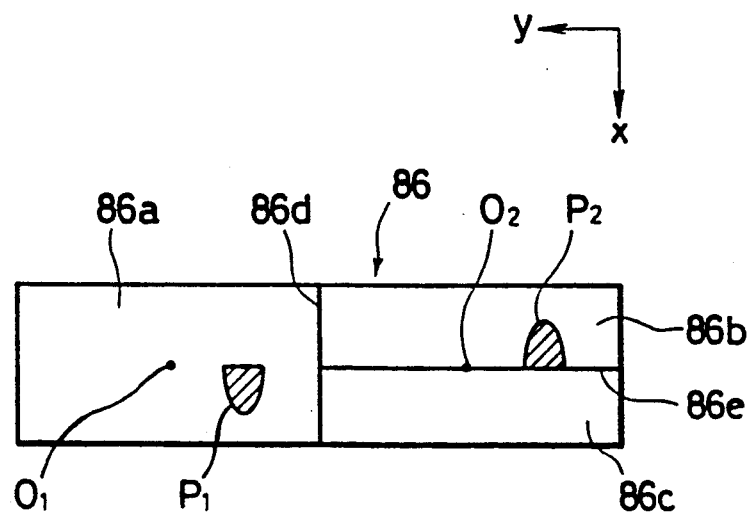
FIG. 5($a,b,c$) is a plan view showing shapes of bright portions formed in the photodetector caused by a wavelength variation of a light beam.
Figure 5:
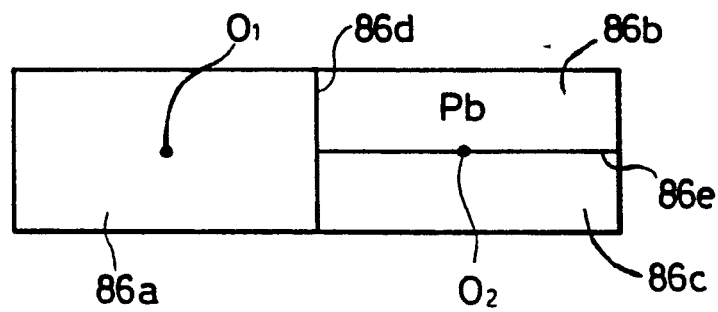
Figure 5:
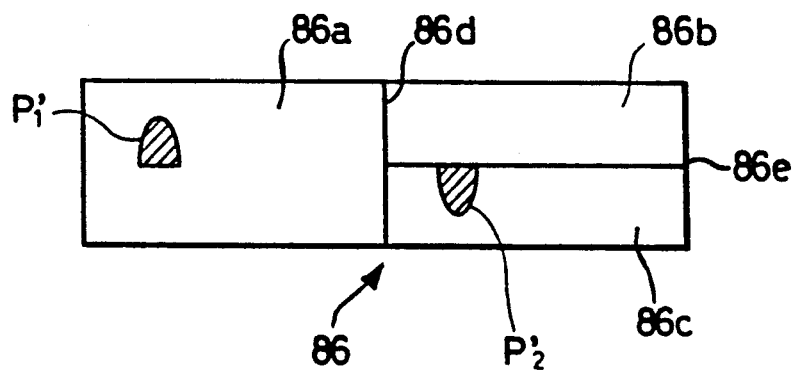

On the other hand, in the case of the optical head device shown in FIG. 1, a shaping prism 84 shapes a cross-sectional intensity distribution in the minor-axis direction, and the minor axis is set to be parallel to the y direction. For this reason, unlike the case of the bright portions $P_{10}$ and $P_{20}$, rate of shape change of bright portions $P_1$ and $P_2$ formed on a photodetector 86 shown in FIG. 5, is sufficiently small with respect to the x direction. Therefore, as shown by a solid line in FIG. 6, its FES intensity shows a gradual change in the vicinity of a zero-cross point on an FES curve f in comparison with the FES curve shown in FIG. 12.

Consequently, when a converging state of the light beam on the optical disk 70 slightly deviates from the just-in-focus state, rate of change in FES intensity is relatively great in the optical head device shown in FIG. 8. Therefore, a higher response in focusing control can be obtained.

Figure 13:
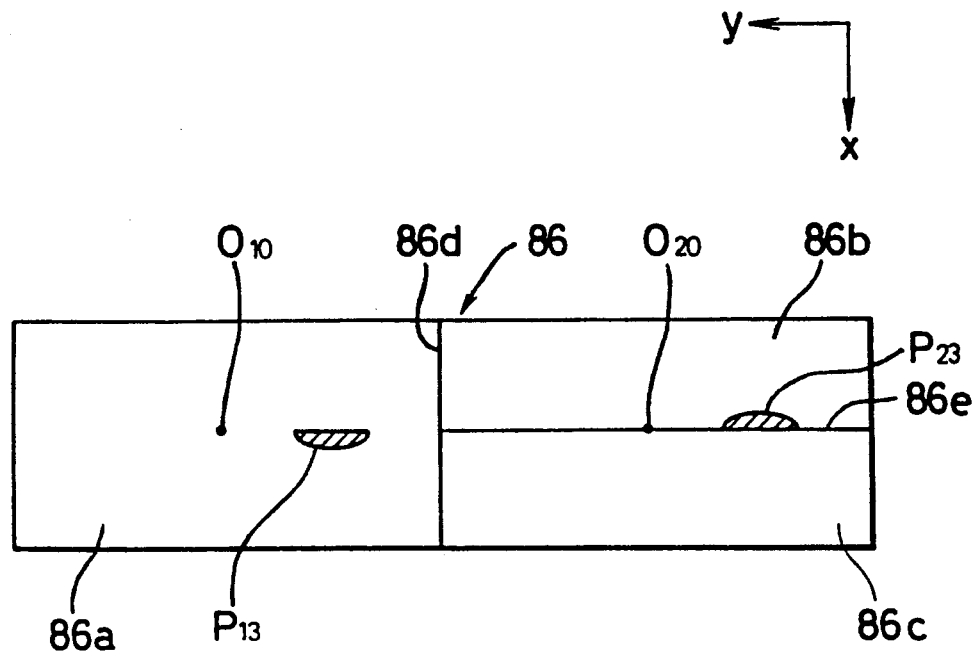
FIG. 13($a,b$) is a plan view showing shapes of bright portions formed in the photodetector caused by a wavelength variation of a light beam in conjunction with the optical head device of FIG. 8.
Figure 13:
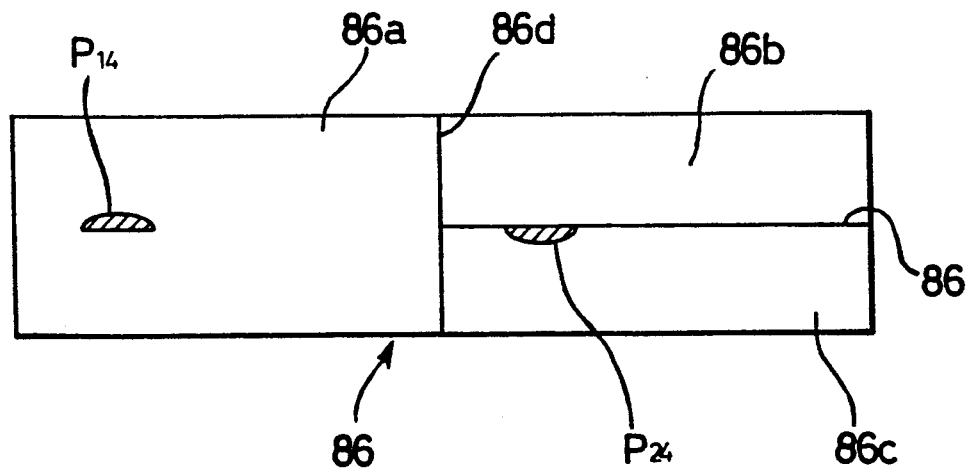

Next, in the case where ambient temperature has risen with respect to the laser light source 81, causing a wave-length $\lambda$ of a light beam emitted from the laser light source 81 to become longer than the reference wave-length $\lambda_0$, each of diffraction angles at the diffraction gratings 82b and 82c becomes greater. Therefore, as with the case of the first embodiment, as illustrated in FIG. 13(a), a bright portion $P_{13}$ formed on the first detecting region 86a by the first diffracted beam is dislocated from the center $O_{10}$ of the first detecting region 86a to move away from the laser light source 81 along the y direction, that is, the reference direction. Similarly, a bright portion $P_{23}$ formed on the second detecting region 86b by the second diffracted beam is dislocated from the center $O_{20}$ of the second division line 86e to move away from the laser light source 81 along the reference direction.

Here, the bright portions $P_{13}$ and $P_{23}$, unlike those shown in FIGS. 3 and 5, show semi-elliptic shapes whose major axes are parallel to the second division line 86e. These shapes are derived from the fact that the bright portion formed on the diffracting element 82 by the reflected beam from the optical disk 70 has an elliptic shape whose major axis is parallel to the division line 82a, as shown in FIG. 10. Further, since each focal point of the diffracted beams is formed in front of the detecting face of the photodetector 86, the bright portions $P_{13}$ and $P_{23}$ lie in the x directions from the major axis. These directions are the same as those of the bright portions $P_{11}$ and $P_{21}$ (see FIG. 11(b)) which are obtained in the case of moving the optical disk 70 away from the object lens 85. Therefore, the bright portion $P_{23}$ formed on the second detecting region 86b lies in the negative direction of the x-axis, while the bright portion $P_{13}$ lies in the positive direction of the x-axis.

On the contrary, in the case where ambient temperature has dropped with respect to the laser light source 81, causing a wave-length $\lambda'$ of a light beam emitted from the laser light source 81 to become shorter than the reference wave-length $\lambda_0$, each of diffraction angles at the diffraction gratings 82b and 82c becomes smaller. Therefore, as illustrated in FIG. 13(a), as with the case of the first embodiment, a bright portion $P_{14}$ formed on the first detecting region 86a by the first diffracted beam is dislocated from the center $O_{10}$ of the first detecting region 86a to be positioned closer to the laser light source 81 along the reference direction. Similarly, a bright portion $P_{24}$ formed on the third detecting region 86c by the second diffracted beam is dislocated from the center $O_{20}$ of the second division line 86e to be positioned closer to the laser light source 81 along the reference direction.

Each of the bright portions $P_{14}$ and $P_{24}$ also shows an semi-elliptic shape whose major axis is parallel to the second division line 86e. Further, since each focal point of the diffracted beams is formed behind the detecting face of the photodetector 86, the bright portion $P_{24}$ lies in the positive direction of the x-axis to be located on the third detecting region 86c, while the bright portion $P_{14}$ lies in the negative direction of the x-axis, both having the opposite orientations to the respective bright portions $P_{23}$ and $P_{13}$.

One example of the FES curve is shown by a broken line in FIG. 12, wherein the wave-length $\lambda$ of the light beam is shorter than the reference wave-length $\lambda_0$. The FES curve shown by the broken line possesses an undesired detection value $S_1$ in the case of the just-in-focus state. Accordingly, there is produced an offset value $\sigma_1$ that forms an improper target value for focusing control. However, the bright portion $P_{23}$ is formed in the vicinity of the second division line 86e of the second detecting region 86b in a semi-elliptic shape whose major axis is parallel to the second division line 86e, and further, detection sensitivity is low in the vicinity of the second division line 86e. As a result, the undesired detection value $S_1$ due to a longer wave-length of the light beam can be extremely suppressed. In addition, since the FES curve has a steep slope as described earlier, the offset value $\sigma_1$ of the optical disk 70 is further extremely reduced. This offset value $\sigma_1$ is sufficiently smaller than the offset value $\sigma_2$ shown in FIG. 6.

Similarly, since detection sensitivity is low in the vicinity of the second division line 86e in the third detecting region 86c and the FES curve has a steep slope, an undesired value of the focus error signal FES in the just-in-focus state and an offset value of the optical disk 70 which are detected due to a shorter wave-length of the light beam, can be extremely suppressed, thereby making it possible to reduce an offset value from the focal point with respect to the optical disk 70 to a substantially small amount.

However, in the optical head device shown in FIG. 8, although adverse effects on the focusing control caused by fluctuations of a wave-length of a light beam can be suppressed, the accuracy of the focusing control may be lowered due to the fluctuations of the optical disk 70. The following description will discuss this problem.

Figure 14:
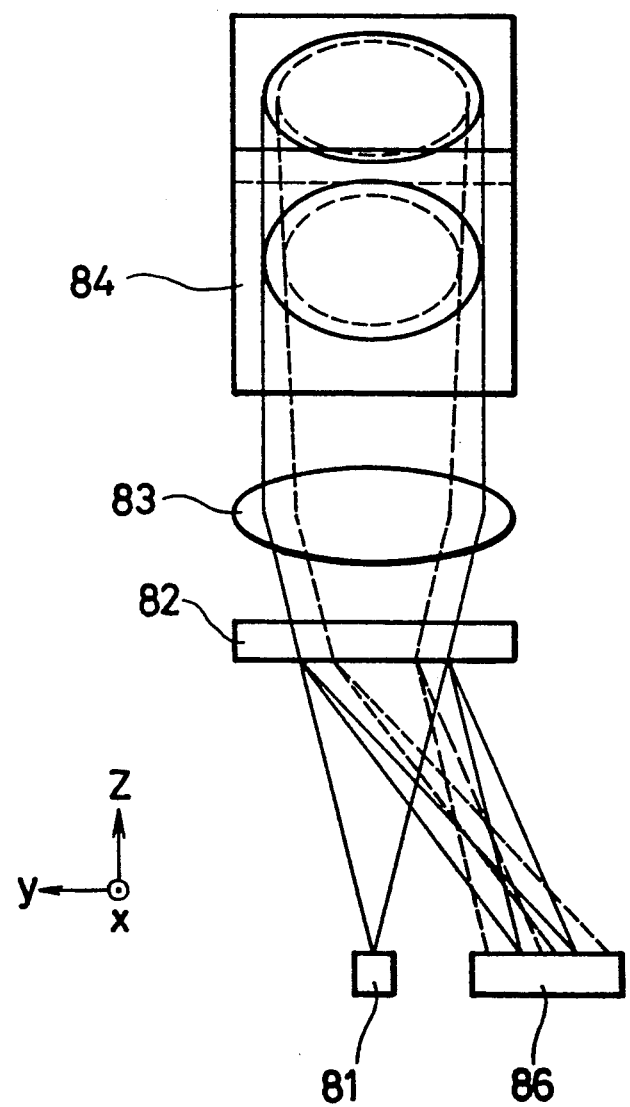
FIG. 14 is a partial side view of the optical head device of FIG. 8, seen from the positive side toward the negative side of the x-axis.
Figure 16:
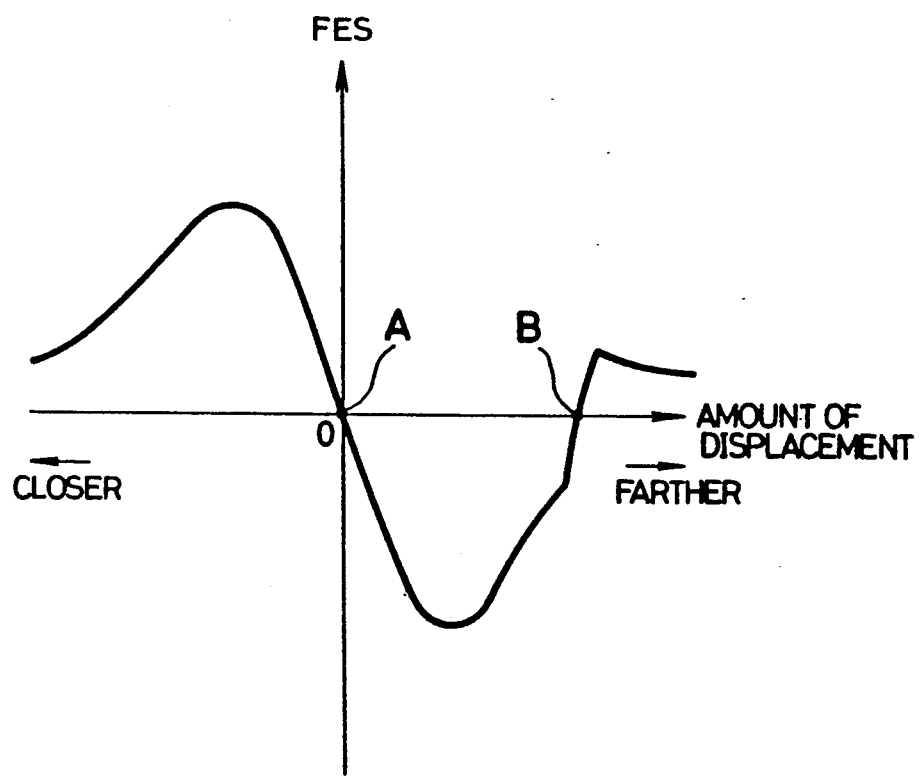
FIG. 16 is a graph showing an example of the FES curve containing an undesired zero-cross point.

Referring to FIG. 4, it has been described in the first embodiment that the shaping prism 84 has astigmatism with respect to the reflected beam. The astigmatism of the shaping prism 84 will be comprehensibly illustrated by broken lines in FIGS. 9 and 14. FIG. 9 shows a state wherein a cross-sectional intensity distribution in the minor axis direction is converging on the diffracting face of the diffracting element 82 when the optical disk 70 moves away from the focal point of the object lens 85 to a certain extent. On the other hand, FIG. 14 illustrates the optical head device of FIG. 9 seen from the positive side toward the negative side along the x-axis, and shows a state wherein a cross-sectional intensity distribution in the major axis direction is converging at a middle position between the diffracting element 82 and the photodetector 86. In the case of the optical head device shown in FIG. 8, since the division line 82a of the diffracting element 82 is set to be parallel to the y-axis, a line-like bright portion P', as shown in FIG. 10, is formed on the division line 82a due to the above-mentioned astigmatism. At this time, as shown in FIG. 16, an undesired zero-cross point appears in the FES curve.

Figure 15:
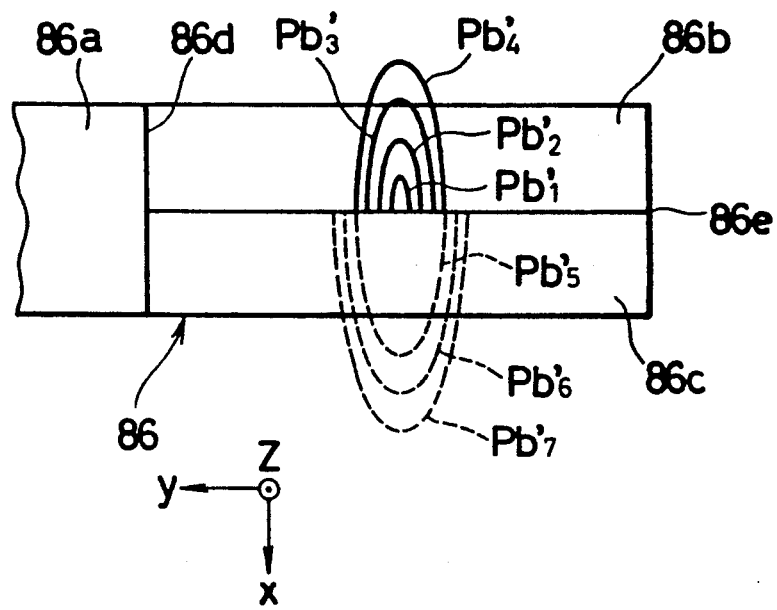
FIG. 15 is a plan view showing how the shape of a bright portion formed on the photodetector varies as the optical disk moves away from the focal point of the object lens in the optical head device of FIG. 8.

The reason why the zero-cross point B appears is described hereinbelow based on changes of the shape of the bright portion Pb' to be formed on the photodetecting region 86b or 86c. When the optical disk 70 slightly moves away from the focal point of the object lens 85, a semi-elliptic bright portion Pb', as shown in FIG. 15 is formed on the second photodetecting region 86b according to the second diffracted beam from the second diffraction grating 82c. As the optical disk 70 moves farther away form the focal point of the object lens 85, the size of the bright portion Pb' is gradually enlarged in the second photodetecting region 86b as shown by $Pb_1$—$Pb_2'$ . . . . Then, the elliptic bright portion formed on the diffracting element 82 is inverted in its shape with respect to the division line 82a, having a line-like bright portion P' formed on the division line 82a as a turning point. Thus, a bright portion $Pb_4'$ formed on the second photodetecting region 86b is inverted to move into the third photodetecting region 86c, thereby forming a bright portion $Pb_5'$. As the optical disk 70 moves farther away from the focal point of the object lens 70, the bright portion $Pb_5'$ is further enlarged in the third photodetecting region 86c as shown by $Pb_6'$—$Pb_7'$ . . . . Consequently, as shown in FIG. 16, when the bright portion Pb' is formed in the second photodetecting region 86b, the value of the focus error signal becomes negative. When the bright portion Pb' is inverted to move into the third photodetecting region 86c, the value of the focus error signal FES is also inverted to become positive. With the inversion of the bright portion Pb', an undesired zero-cross point B appears in the FES curve.

If the undesired zero-cross point B appeared within a dynamic range of focusing control, the object lens 85 might be driven so as to focus on an incorrect target derived from the undesired zero-cross point B when focusing control is conducted on the object lens 85 from a farther position to a closer position with respect to the optical disk 70. Moreover, the more the bright portion formed on the diffracting element 82 becomes like a line in shape from its elliptic shape, the more it becomes difficult to equally allocate the bright portion onto the diffraction gratings 82b and 82c on the diffracting element 82, only with the division line 82a of the diffracting element 82 slightly deviated from the optical axis or slightly tilted with respect to the x direction. Therefore, it is difficult to obtain an accurate focus error signal FES in the vicinity of the undesired zero-cross point B.

The following description will discuss the fourth embodiment. An optical head device of the fourth embodiment provides a best mode to solve both of the problems occasioned by wave-length fluctuations and appearance of an undesired zero-cross point. Additionally, for convenience of explanation, those of the members having the same functions and described in the first embodiment are indicated by the same reference numerals and the description thereof is omitted.

Figure 17:
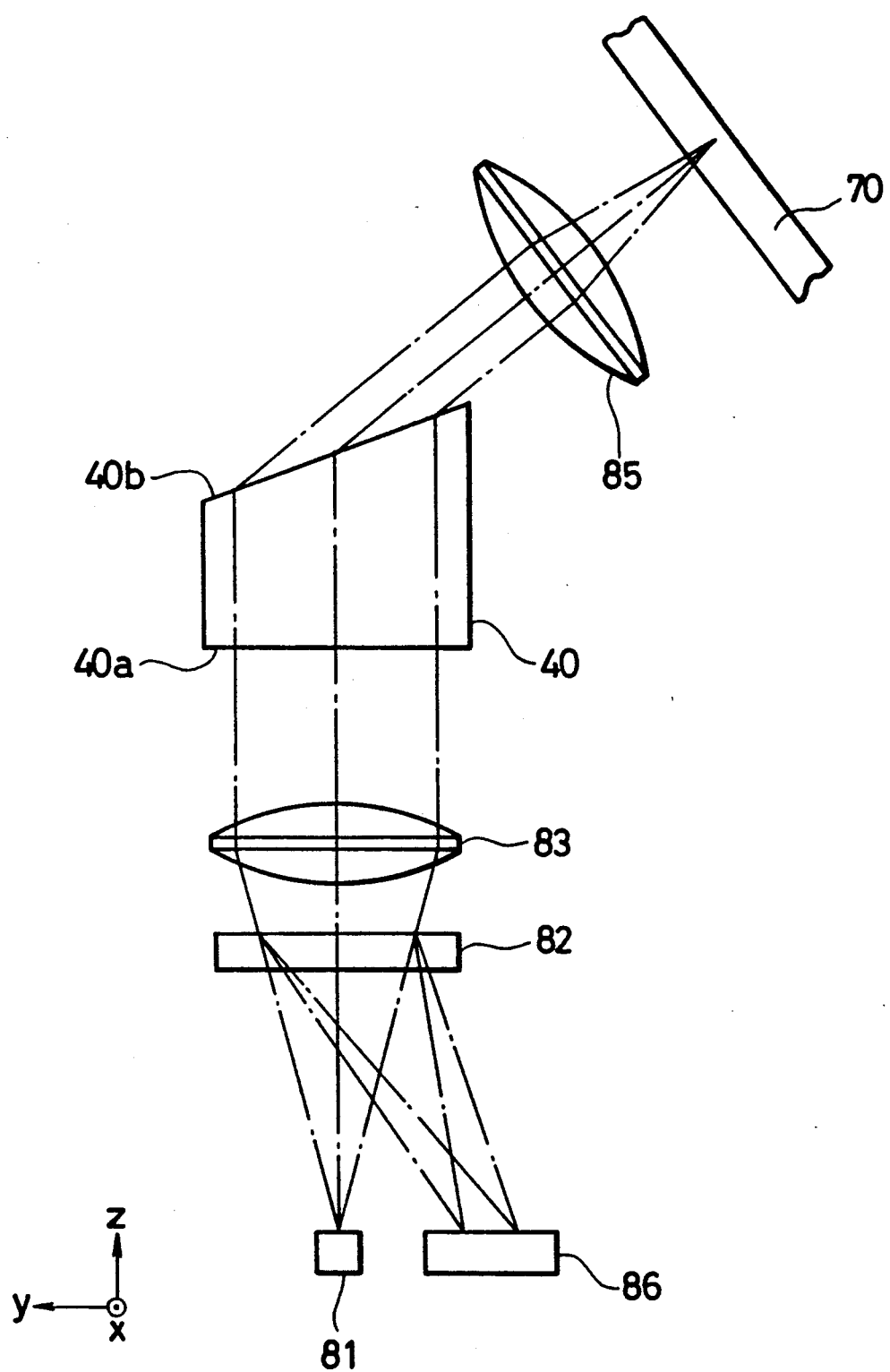
FIG. 17 is a side view showing still another structural example of an optical head device according to the present invention.

As shown in FIG. 17, the arrangement of the laser light source 81, diffracting element 82 and photodetector 86 provided in the optical head device of the fourth embodiment is the same as that of the third embodiment. That is, a major axis of an elliptic bright portion formed on the diffracting element 82 is set to be parallel to the reference direction. However, as to the shaping prism 40, an end face 40a whereon a light beam emitted from the laser light source 81 is directed is set to be orthogonal to the light beam; and the other end face 40b facing the object lens 85 is inclined at a predetermined angle with respect to the x-y plane and x-z plane. Thus, the shaping prism 40 condenses a cross-sectional intensity distribution of the light beam emitted from the laser light source 81 in the major axis direction, that is, the reference direction, thereby shaping the cross-sectional intensity distribution into a circular shape having a diameter identical to the length of the minor axis of the elliptic shape. Further, the shaping prism 40, upon receiving a reflected beam from the optical disk 70, diffuses its cross-sectional intensity distribution with respect to the major axis direction. Thus, the cross-sectional intensity distribution of the reflected beam is returned to a substantially elliptic shape from the substantially circular shape.

Figure 11:
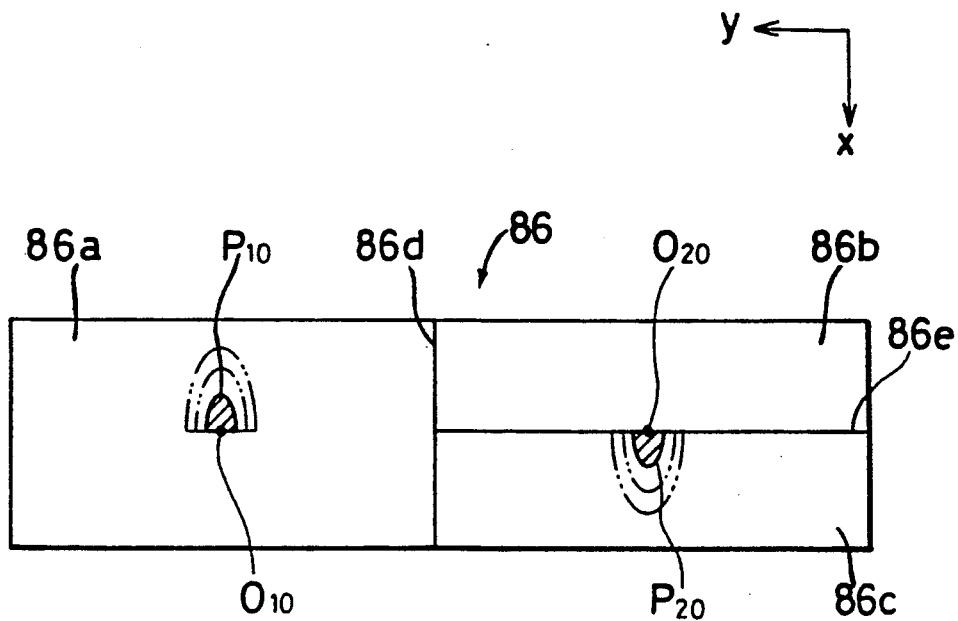
FIG. 11($a,b$) is a plan view showing shapes of bright portions formed on a photodetector caused by a fluctuation of an optical disk in the optical head device shown in FIG. 8.
Figure 11:
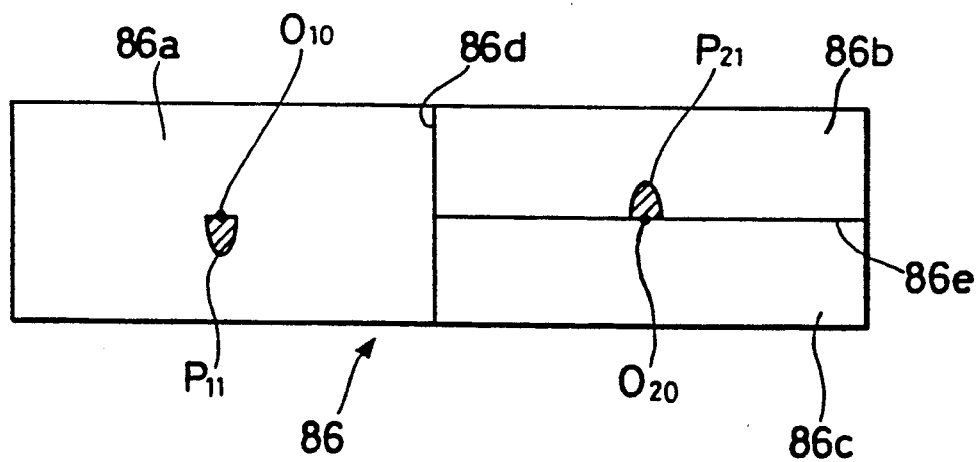
Figure 18:
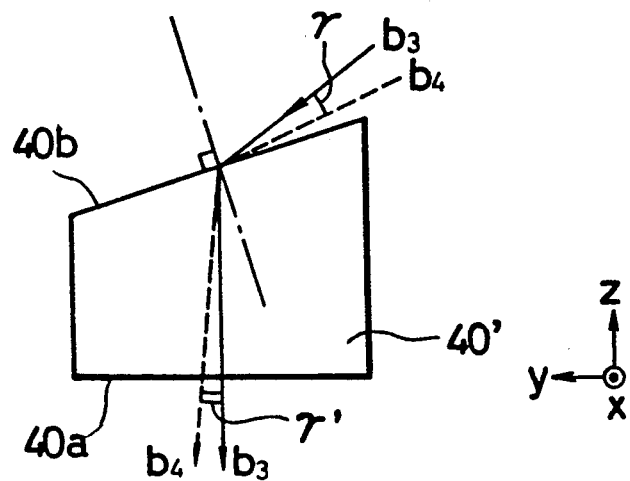
FIG. 18 is an explanatory drawing showing an optical function of a shaping prism provided in the optical head device of FIG. 17.

In the case of using the optical head device of the present invention, a rate of change of the shapes of the bright portions formed on the photodetector 86 due to a focus error becomes smaller with respect to y direction wherein the cross-sectional intensity distribution is diffused or condensed than that of the bright portions $P_{10}$ and $P_{20}$ shown in FIG. 11. This is based on optical properties of the shaping prism 40 which will be described hereinbelow. A reflected beam $b_3$ produced from the light beam focused on the optical disk 70 passes through the shaping prism 40 and is projected therefrom following a light path shown by a solid line in FIG. 18. Now, suppose that the light beam directed on the optical disk 70 has a focus error, thereby causing a reflected beam $b_4$ from the optical disk 70 to tilt with respect to the reflected beam $b_3$. In this case, when a difference between incident angles of the reflected beam $b_3$ and the reflected beam $b_4$ with respect to the end face 40b facing the object lens 85 is denoted by γ and a difference between angles of refraction of the reflected beam $b_3$ and the reflected beam $b_4$ is denoted by γ', γ' becomes smaller than γ. In other words, concerning rate of change in the bright portions formed on the photodetector 86 due to a focus error, a rate of change in y direction subjected to the shaping function of the shaping prism 40 is smaller than a rate of change in x direction not subjected to the shaping function thereof. Therefore, as with the shapes of the bright portions $P_{10}$ and $P_{20}$ shown in FIG. 11, the bright portions formed on the photodetector 86 have semi-elliptic shapes stretching to a greater extent in x direction than in y direction (not shown).

Figure 19:
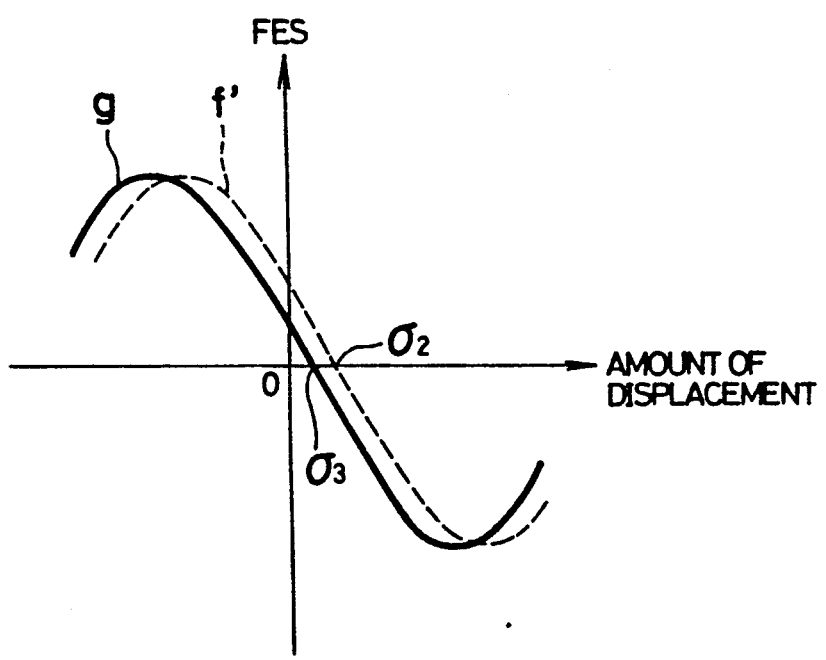
FIG. 19 is a graph showing the relationship between the amount of displacement of the optical disk, shown in FIG. 17, based on a focal point of an object lens as a reference and the variation of intensity of a focus error signal FES.

FIG. 19 shows an example of FES curve g in the case of a presence of a wave-length variation in the optical head device shown in FIG. 17. Here, a rate of change in x direction not subjected to the shaping function of the shaping prism 40 is identical to that of the optical head device shown in FIG. 1. Consequently, since the rate of change in the FES curve g is identical to that in the FES curve f shown in FIG. 6 (also drawn in FIG. 19 for reference), the responsibility for focusing control is identical to that of the optical head device shown in FIG. 1. However, in the case of the optical head device shown in FIG. 17, since the major axis of the elliptic cross-sectional intensity distribution is set to be parallel to the y direction, that is, the reference direction, the offset value of the optical disk 70 is further reduced. For the same reasons described regarding the optical head device shown in FIG. 8, the bright portion is formed in the vicinity of the second division line 86e where detection sensitivity of the photodetector 86 is low, in a semi-elliptic shape whose major axis is parallel to the second division line 86e and prolonged in the reference direction. Therefore, even if responsibility in focusing control remains unchanged, the offset value $\sigma_3$ is reduced to less than the offset value $\sigma_2$ of the optical head device shown in FIG. 1.

Furthermore, in the optical head device of FIG. 17, there is no appearance of an undesired zero-cross point within a control range of focus errors. This is because, as described above, the shaping prism 40 is designed to shape the cross-sectional intensity distribution of the light beam not in the minor axis direction orthogonal to the division line 82a but in the major axis direction parallel to the division line 82a. Consequently, unless the optical disk 70 moves considerably far away from the focal point of the object lens 85, it is avoided that the reflected beam forms a line-like bright portion P' as shown in FIG. 10 on the diffracting element 82. Since the displacement of the optical disk 70, for example, in the order of several millimeters is necessary for the line-like bright portion P' to be formed on the diffracting element 82, it is too large to be contained in the control range of focus errors. Therefore, there is virtually no presence of a zero-cross point in the FES curve except one in the just-in-focus state.

As described above, the optical head device of FIG. 17 makes it possible to avoid having a lowered accuracy in focusing control caused by wave-length fluctuations of the light beam and/or an appearance of an undesired zero-cross point in the FES curve, resulting in a preferable recording or reproducing operation.

Additionally, the fourth embodiment has discussed a light beam having a cross-sectional intensity distribution whose major axis is parallel to the reference direction; yet another arrangement is adoptable, wherein its minor axis is set to be parallel to the reference direction. In any case, the most important thing is to design the shaping prism 40 so as to condense the cross-sectional intensity distribution in the major axis direction.

Lastly, the following description will discuss structural examples of an optical head device for obtaining a more desirable tracking error signal RES in conjunction with the structure of the optical head device shown in FIG. 8. Three cases are shown as those structural examples.

(1) With respect to relative positions between the optical head device and the recording track 71 on the optical disk 70, both shown in FIG. 8, a tangent direction at the converging point of the recording track 71 is set to be parallel to the y-axis. That is, the above tangent direction is orthogonal to the tangent direction T shown in FIG. 8.

Figure 20:
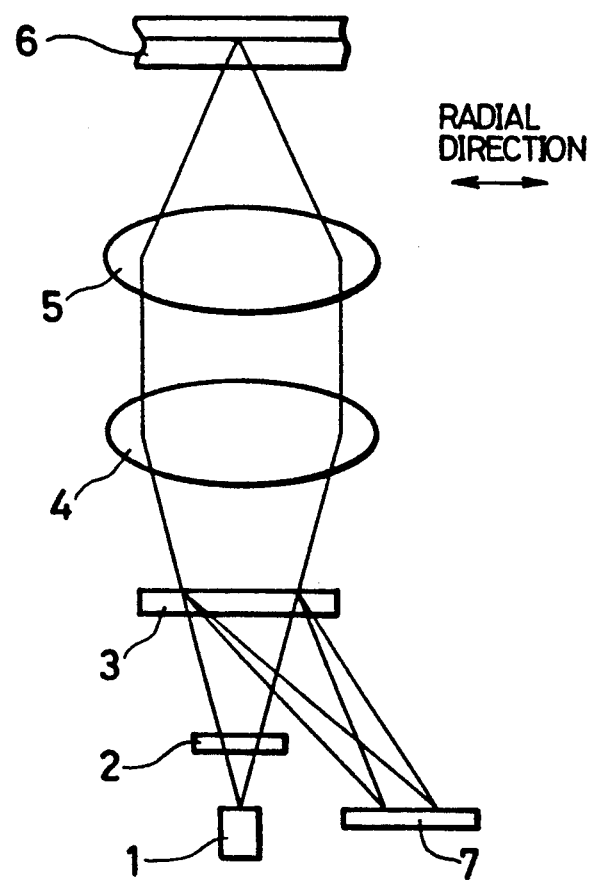
FIG. 20 is a side view showing a structural example of an optical head device wherein a preferable tracking error signal is obtained.

(2) The three-beam method is adopted: three-beam method, a light beam is projected from a semiconductor laser 1, diffracted in a first diffracting element 2 and split into a zero-order diffracted light (main beam) and ±1 order diffracted lights (a pair of sub beams). In FIG. 20, the ±1 order diffracted lights are comprised in a plane orthogonal to the surface of the paper. The main beam and the sub beams are further diffracted in a second diffracting element 3. Zero-order diffracted lights respectively produced by the main beam and the sub beams are transmitted through a collimating lens 4 to be focused onto a recording medium 6 by an objective lens 5. Return lights reflected off the recording medium 6 pass through the objective lens 5 and the collimating lens 4, and are diffracted in the second diffracting element 3. First order diffracted lights are then directed onto a light receiving element 7 from which data signal, tracking error signal and focus error signal can be obtained.

When, for example, data is recorded in the form of physical pits on the disc-shaped recording medium 6, the data is read out by focusing the zero order diffracted light produced by the main beam in the second diffracting element 3 on the physical pits. The return light of the zero order diffracted light is diffracted again in the second diffracting element 3 to produce first order diffracted lights. The data signal is derived from the intensity of these first order diffracted lights.

The zero order diffracted lights produced by the two sub beams in the second diffracting element 3 are focused on positions symmetrical with respect to the zero order diffracted light produced by the main beam in the second diffracting element 3. These positions are offset greatly in a track direction and offset slightly in a radial direction from the position on the recording medium 6 where the zero order diffracted light of the main beam is focused. The return lights are respectively diffracted in the second diffracting element 3 to produce first order diffracted lights. The tracking error signal is derived from the intensities of these first order diffracted lights.

Figure 21:
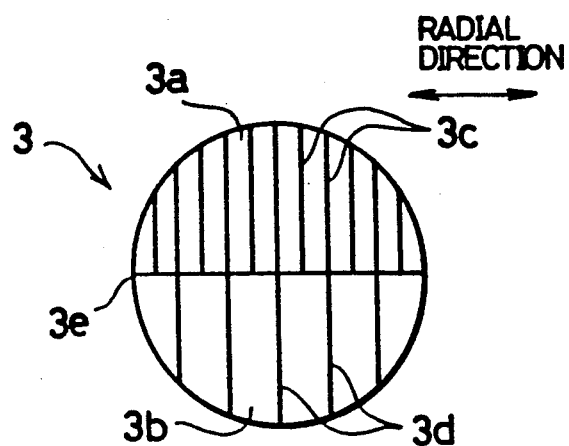
FIG. 21 is a plan view showing a second diffracting element in the optical head device of FIG. 20.
Figure 22:
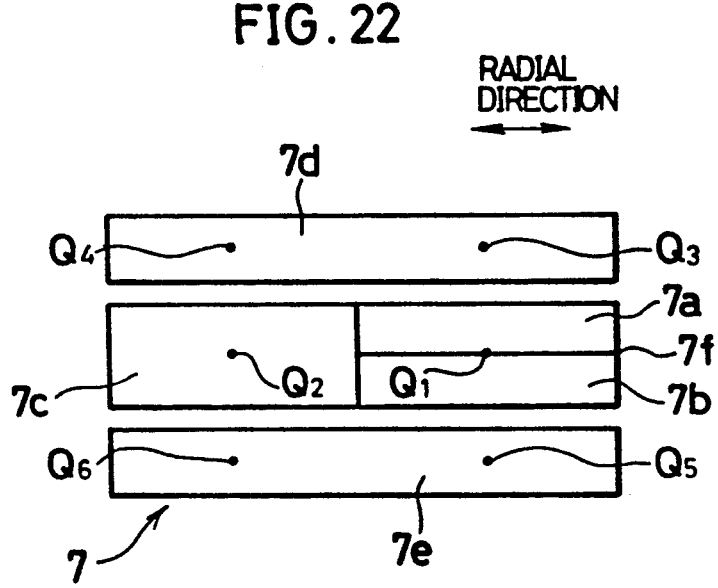
FIG. 22 is a plan view showing a light-receiving element in the optical head device of FIG. 20.

FIG. 21 shows the second diffracting element 3 as seen from the recording medium 6. As shown in FIG. 16, the second diffracting element 3 is divided into two diffracting regions 3a and 3b that are delineated by a division line 3e and whereon gratings 3c and 3d are respectively formed. The gratings 3c and 3d have mutually different pitches and the directions thereof are orthogonal to the division line 3e. Here, the direction of the division line 3e is set so as to coincide with the radial direction of the recording medium 6. As shown in FIG.

22, the light receiving element 7 is divided into five light receiving regions 7a to 7e.

In the above arrangement, when the light beam projected from the semiconductor laser 1 is precisely focused on the recording medium 6, a portion of the return light corresponding to the zero order diffracted light produced by the main beam in the second diffracting element 3, is diffracted in the diffracting region 3a of the second diffracting element 3 to produce a first order diffracted light. This first order diffracted light is focused on a division line 7f separating the light receiving regions 7a and 7b, to form a spot-shaped diffracted image $Q_1$. Another portion of the return light corresponding to the zero order diffracted light of the main beam produced in the second diffracting element 3, is diffracted in the diffracting region 3b of the second diffracting element 3 to produce a first order diffracted light. This first order diffracted light is focused on the light receiving region 7c to form a spot-shaped diffracted image $Q_2$. The return lights corresponding to the zero order diffracted lights produced by the two sub beams in the second diffracting element 3, respectively form two spot-shaped diffracted images $Q_3$ and $Q_4$ and two spot-shaped diffracted images $Q_5$ and $Q_6$ on the light receiving regions 7d and 7e.

Supposing that $S_{1a}$ to $S_{1e}$ respectively represent output signals released from the light receiving regions 7a to 7e, the focus error signal may be obtained by calculating $(S_{1a}-S_{1b})$. The tracking error signal may be obtained by calculating $(S_{1d}-S_{1e})$ and the data signal may be obtained by calculating $(S_{1a}+S_{1b}+S_{1c})$.

Figure 23:
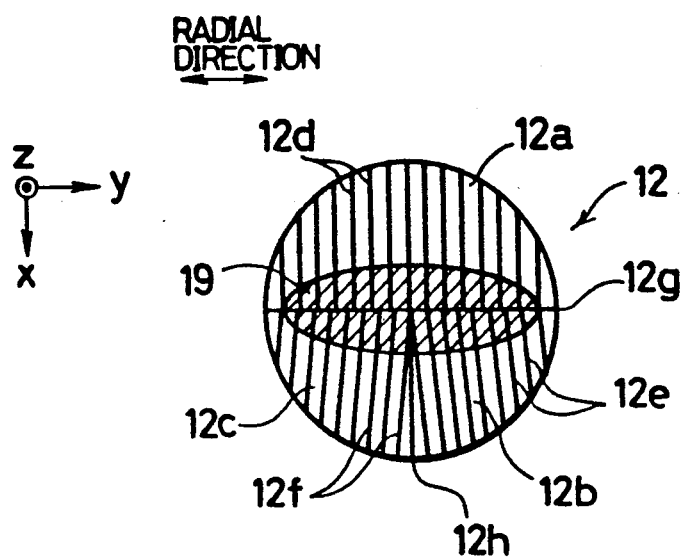
FIG. 23 is a plan view showing another diffracting element adaptable to the optical head device of FIG. 8.

(3) The diffracting element 82 and photodetector 86 shown in FIG. 8 are respectively replaced with a diffracting element 12 shown in FIG. 23 and a light receiving element 24 shown in FIG. 19:

As shown in FIG. 23, the diffracting element 12 as seen from the recording medium, is divided by division lines 12g and 12h into three diffracting regions 12a to 12e. Gratings 12d to 12f are respectively formed on the diffracting regions 12a to 12c. The division line 12g extends in a y direction corresponding to a radial direction of the recording medium. The division line 12h starts from the center of the division line 12g and extends in the x direction orthogonal to the radial direction of the recording medium, i.e., in a track direction of the recording medium. The diffracting regions 12b and 12c (diffracting regions for tracking) are designed such as to have mutually equal areas. In addition, provision is made such that the area of the diffracting region 12a (diffracting region for focusing) is equal to the sum of the areas of the diffracting regions 12b and 12c. A cross section 19 formed by the return light impinging upon the diffracting element 12 has a substantially elliptic shape. In the present embodiment, a major axis (y direction) of the cross section 19 coincides with the direction of the division line 12g. In other words, the major axis of the return light corresponds to the radial direction of the recording medium.

Here, the radial direction is defined as a direction extending from the center of rotation of the recording medium to a position where the light beam is irradiated on the recording medium. As for the track direction, it is defined as a direction on the recording medium orthogonal to the radial direction. The direction corresponding to the radial direction is defined as a projection of the radial direction upon the diffracting element 12 while the direction corresponding to the track direction is defined as a projection of the track direction upon the diffracting element 12.

The grating 12d formed on the diffracting region 12a has a grating direction orthogonal to the division line 12g. A grating direction of the grating 12e formed on the diffracting region 12b and a grating direction of the grating 12f of the diffracting region 12c are inclined in mutually opposite directions with respect to the division line 12h. Here, the pitches of the gratings 12d to 12f and the inclination of the gratings 12e and 12f are respectively determined according to relative positions of the diffracting regions 12a to 12e and diffracted images $P_{31}$ to $P_{33}$, to be described later, formed on the light receiving element 17. In order to correct aberrations, grating lines of the gratings 12d to 12f can be designed, when necessary, so as to describe gradual curves.

Figure 24:
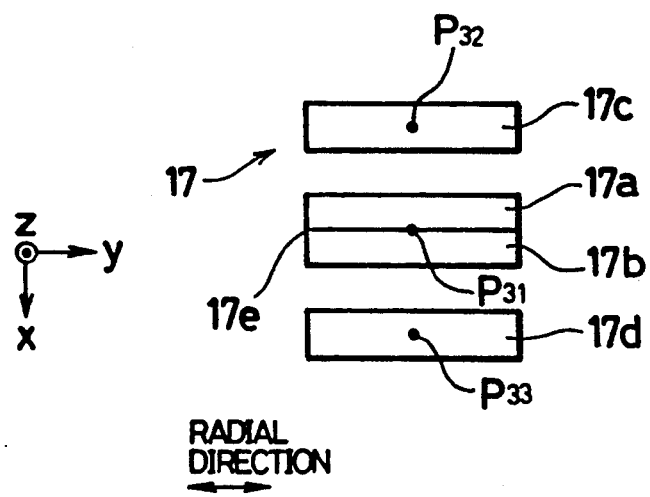
FIG. 24 is a plan view showing another photodetector adaptable to the optical head device of FIG. 8.

As shown in FIG. 24, the light receiving element 17 is divided into four rectangular light receiving regions 17a to 17d. The light receiving regions 17a to 17d are aligned in the x direction corresponding to the track direction of the recording medium and extend in the y direction corresponding to the radial direction of the recording medium. The two central light receiving regions 17a and 17b (light receiving regions for focusing) are divided by a division line 17e. The division line 17e extends in the y direction corresponding to the radial direction of the recording medium. The light receiving regions 17c and 17d (light receiving regions for tracking) are respectively separated in the x direction from the light receiving regions 17a and 17b by a predetermined interval.

When the light beam projected from the semiconductor laser is precisely focused upon the recording medium, the diffracted light produced in the diffracting region 12a of the diffracting element 12 forms the spot-shaped diffracted image $P_{31}$ on the division line 17e. Meanwhile, the diffracted light produced in the diffracting region 12b forms the spot-shaped diffracted image $P_{32}$ on the light receiving region 17c and the diffracted light produced in the diffracting region 12c forms the spot-shaped diffracted image $P_{33}$ on the light receiving region 17d.

When there is no focus error, the diffracted image $P_{31}$ is equally distributed between the light receiving regions 17a and 17b, and ideally forms one spot on the division line 17e. On the other hand, when a focus error occurred, the diffracted image $P_{31}$ spreads to a greater extent on either the light receiving region 17a or the light receiving region 17b. Therefore, supposing that Sa to Sd respectively represent output signals released from the light receiving regions 17a to 17d, the focus error signal may be obtained through a single knife edge method by calculating $(Sa-Sb)$. The tracking error signal is obtained by comparing the respective light amounts of the diffracted lights from the diffracting regions 12b and 12c divided by the division line 12h extending in the x direction corresponding to the track direction of the recording medium, and calculating $(Sc-Sd)$ through a push-pull method. In addition, the data signal is obtained by calculating $(Sa+Sb+Sc+Sd)$.

In accordance with the above description, when an optical head device of the present invention is designed as follows, it is avoidable to have an undesired zero-cross point in the FES curve, and further it is possible to lessen the accuracy required for the installation of the diffracting element.

(1) The light source emits light having an elliptic cross-sectional intensity distribution whose major axis is parallel to a reference direction.

(2) At least one of the division lines of the diffracting element is set to be parallel to the reference direction.

(3) The optical members direct a reflected light from the recording medium to the diffracting element so that on the diffracting face is formed an elliptic bright portion whose major axis is orthogonal to the division line of the diffracting element.

(4) When there is no focus error, a part of the reflected light directed to the diffracting element is diffracted to converge on the division line which is substantially parallel to the reference direction on the photodetector.

Moreover, when another optical head device of the present invention is designed as follows, it is possible to suppress offsets in focusing control caused by wavelength fluctuations of the light beam, and further it is possible to improve responsibility in focusing control.

(1) The light source emits light having an elliptic cross-sectional intensity distribution whose major axis is parallel to a reference direction.

(2) At least one of the division lines of the diffracting element is set to be parallel to the reference direction.

(3) The optical members direct a reflected light from the recording medium to the diffracting element so that on the diffracting face is formed an elliptic bright portion whose major axis is parallel to the division line of the diffracting element.

(4) When there is no focus error, a part of the reflected light directed to the diffracting element is diffracted to converge on the division line which is substantially parallel to the reference direction on the photodetector.

Furthermore, when still another optical head device of the present invention is designed as follows, a most preferable recording or reproducing operation is obtained.

(1) The light source emits light having an elliptic cross-sectional intensity distribution whose major axis is orthogonal to a reference direction.

(2) At least one of the division lines of the diffracting element is set to be parallel to the reference direction.

(3) The shaping prism shapes the elliptic cross-sectional intensity distribution in the major axis direction, and alternatively changes the shape of the cross-sectional intensity distribution between the elliptic shape and a circular shape.

(4) The optical members direct a reflected light from the recording medium to the diffracting element so that on the diffracting face is formed an elliptic bright portion whose major axis is parallel to the division line of the diffracting element.

(5) When there is no focus error, a part of the reflected light directed to the diffracting element is diffracted to converge on the division line which is substantially parallel to the reference direction on the photodetector.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical head device comprising:

light generation means for generating light having intensity distribution showing a substantially elliptic shape in a cross section orthogonal to an optical axis, a major axis of the elliptic shape being parallel to a reference direction;

photodetecting means for generating detection signals so as to obtain a focus error signal, the photodetecting means including a plurality of photodetecting sections formed by a plurality of division lines dividing a light-receiving face thereof, the detection signals being released by the respective photodetecting sections according to the intensity of light entered thereto, at least one of the plurality of division lines being substantially parallel to the reference direction;

diffraction means including a plurality of diffracting regions formed by a plurality of division lines dividing a diffraction face, at least one of the plurality of division lines for dividing the diffraction face being parallel to the reference direction; and optical means for converging the light emitted from the light generation means on a recording track formed on the recording medium and further directing reflected light from the recording track to the diffraction means so that the major axis of an elliptic bright portion formed on the diffracting face by the reflected light may be positioned on said one of the division lines in the diffraction means, the division line being parallel to the reference direction, whereby a value of the focus error signal is zero when a part of the reflected light that has been diffracted by at least one of the diffracting regions of the diffraction means is converged on said one of the division lines in the photodetecting means, which is substantially parallel to the reference direction.

2. An optical head device as set forth in claim 1, wherein the optical means comprises:

intensity distribution shaping means for shaping an intensity distribution of the light to be directed on the recording track into a substantially circular shape by diffusing the elliptic intensity distribution of the light emitted by the light generation means with respect to the minor axis, and permitting the intensity distribution of the light reflected from the recording track to restore its substantially elliptic shape.

3. An optical head device as set forth in claim 1, wherein the optical means comprises:

intensity distribution shaping means for shaping an intensity distribution of the light to be directed on the recording track into a substantially circular shape by condensing the elliptic intensity distribution of the light emitted by the light generation means with respect to the major axis, and permitting the intensity distribution of the light reflected from the recording track to restore its substantially elliptic shape.

4. An optical head device as set forth in claim 2 or claim 3, wherein the optical means further comprises:

parallel light beam forming means for allowing the light emitted from the light generation means to form a parallel beam of light.

5. An optical head device as set forth in claim 4, wherein the parallel light beam forming means comprises:

collimating lens means for allowing the light to form a parallel beam of light, the light being emitted from the light generation means and transmitted through the diffraction means to be directed to the intensity distribution shaping means.

6. An optical head device as set forth in claim 2 or claim 3, wherein the optical means further comprises:
converging means for converging on the recording track of the recording medium the light whose intensity distribution is shaped into a circular shape by the intensity distribution shaping means.

7. An optical head device as set forth in claim 1, wherein the diffraction means includes at least two diffracting regions formed by at least one division line parallel to the reference direction, the diffracting regions being provided with respective gratings whose pitch is different from each other; and
the photodetecting means includes a first photodetecting section and a second photodetecting section formed by a first division line that are contained within the light-receiving face and orthogonal to the reference direction, the second photodetecting section being provided with a third photodetecting section and a fourth photodetecting section formed by a second division line extending from a middle point of the first division line substantially in parallel with the reference direction,
whereby a value of the focus error signal is zero when a part of the reflected light having been diffracted by said one of the diffracting regions of the diffraction means is converged on the second division line in the photodetecting means.

8. An optical head device as set forth in claim 7, wherein the diffraction means includes two diffracting regions formed by one division line substantially parallel to the reference direction,
whereby, when the value of the focus error signal becomes zero, a part of reflected light diffracted by one of the diffracting regions is converged on the second division line, while the other part of the reflected light diffracted by the other diffracting region is converged on a substantial center of the first photodetecting section, and
when a detection signal released from a first photodetecting section is represented as Sa; a detection signal released from a third photodetecting section is represented as Sb; and a detection signal released from a fourth photodetecting section is represented as Sc, a reproduction signal of information recorded on the recording medium is obtained by a calculation of Sa+Sb+Sc; the focus error signal is obtained by a calculation of Sc−Sb; and a tracking error signal is obtained by a calculation of Sa−(Sb+Sc).

9. An optical head device comprising:
light generation means for generating light having intensity distribution showing a substantially elliptic shape in a cross section orthogonal to an optical axis, a minor axis of the elliptic shape being parallel to a reference direction;
photodetecting means for generating detection signals so as to obtain a focus error signal, the photodetecting means including a plurality of photodetecting sections formed by a plurality of division lines dividing a light-receiving face thereof, the detection signals being released by the respective photodetecting sections according to the intensity of light entered thereto, at least one of the plurality of division lines being substantially parallel to the reference direction;
diffraction means including a plurality of diffracting regions formed by a plurality of division lines dividing a diffraction face, at least one of the plurality of division lines for dividing the diffraction face being parallel to the reference direction; and
optical means for converging the light emitted from the light generation means on a recording track formed on the recording medium and further directing reflected light from the recording track to the diffraction means so that the minor axis of an elliptic bright portion formed on the diffracting face by the reflected light may be positioned on said one of the division lines in the diffraction means, the division line being parallel to the reference direction,
whereby a value of the focus error signal is zero when a part of the reflected light that has been diffracted by at least one of the diffracting regions of the diffraction means is converged on said one of the division lines in the photodetecting means, which is substantially parallel to the reference direction.

10. An optical head device as set forth in claim 9, wherein the optical means comprises:
intensity distribution shaping means for shaping an intensity distribution of the light to be directed on the recording track into a substantially circular shape by diffusing the elliptic intensity distribution of the light emitted by the light generation means with respect to the minor axis, and permitting the intensity distribution of the light reflected from the recording track to restore its substantially elliptic shape.

11. An optical head device as set forth in claim 9, wherein the optical means comprises:
intensity distribution shaping means for shaping an intensity distribution of the light to be directed on the recording track into a substantially circular shape by condensing the elliptic intensity distribution of the light emitted by the light generation means with respect to the major axis, and permitting the intensity distribution of the light reflected from the recording track to restore its substantially elliptic shape.

12. An optical head device as set forth in claim 10 or claim 11, wherein the optical means further comprises:
parallel light beam forming means for allowing the light emitted from the light generation means to form a parallel beam of light.

13. An optical head device as set forth in claim 12, wherein the parallel light beam forming means comprises:
collimating lens means for allowing the light to form a parallel beam of light, the light being emitted from the light generation means and transmitted through the diffraction means to be directed to the intensity distribution shaping means.

14. An optical head device as set forth in claim 10 or claim 11, wherein the optical means further comprises:
converging means for converging on the recording track of the recording medium the light whose intensity distribution is shaped into a circular shape by the intensity distribution shaping means.

15. An optical head device as set forth in claim 9, wherein the diffraction means includes at least two diffracting regions formed by at least one division line parallel to the reference direction, the diffracting regions being provided with respective gratings whose pitch is different from each other; and the photodetecting means includes a first photodetecting section and a second photodetecting section formed by a first division line that are contained within the light-receiving face and orthogonal to the reference direction, the second photodetecting section being provided with a third photodetecting section and a fourth photodetecting section formed by a second division line extending from a middle point of the first division line substantially in parallel with the reference direction, whereby a value of the focus error signal is zero when a part of the reflected light having been diffracted by said one of the diffracting regions of the diffraction means is converged on the second division line in the photodetecting means.

16. An optical head device as set forth in claim 15, wherein the diffraction means includes two diffracting regions formed by one division line substantially parallel to the reference direction, whereby, when the value of the focus error signal becomes zero, a part of reflected light diffracted by one of the diffracting regions is converged on the second division line, while the other part of the reflected light diffracted by the other diffracting region is converged on a substantial center of the first photodetecting section, and when a detection signal released from a first photodetecting section is represented as Sa; a detection signal released from a third photodetecting section is represented as Sb; and a detection signal released from a fourth photodetecting section is represented as Sc, a reproduction signal of information recorded on the recording medium is obtained by a calculation of $Sa+Sb+Sc$; the focus error signal is obtained by a calculation of $Sc-Sb$; and a tracking error signal is obtained by a calculation of $Sa-(Sb+Sc)$.

17. An optical head device as set forth in claim 9, wherein the diffraction means includes at least two diffraction regions formed by at least one division line parallel to the reference direction, the diffraction regions being provided with respective gratings whose pitch is different from each other; and the photodetecting means includes a first through fourth photodetecting regions formed by a first through third division lines that are contained within the light-receiving face and substantially parallel to the reference direction, whereby a value of the focus error signal is zero when a part of reflected light having been diffracted by one of the diffraction regions is converged on the first division line separating the first and the second photodetecting regions, and further another part of the reflected light having been diffracted by another of the diffraction regions is converged on a third division line separating the third and fourth photodetecting regions.

18. An optical head device as set forth in claim 17, wherein the diffraction means includes two diffraction regions formed by the one division line parallel to the reference direction, and when the value of the focus error signal is zero, a part of reflected light diffracted by one of the diffraction regions is converged on the first division line separating the first and second photodetecting regions and further the other part of the reflected light diffracted by the other of the diffraction regions is converged on the third division line separating the third and fourth photodetecting regions, whereby, when a detection signal released from a first photodetecting region is represented as Sa; a detection signal released from a second photodetecting region is represented as Sb; a detection signal released from a third photodetecting region is represented as Sc; and a detection signal released from a fourth photodetecting region is represented as Sd, a reproduction signal of information recorded on the recording medium is obtained by a calculation of $Sa+Sb+Sc+Sd$; the focus error signal is obtained by a calculation of $(Sa-Sb)+(Sd-Sc)$; and a tracking error signal is obtained by a calculation of $(Sa+Sb)-(Sd+Sc)$.

* * * * *